United States Patent
Weiss et al.

[11] Patent Number: 5,866,889
[45] Date of Patent: Feb. 2, 1999

[54] INTEGRATED FULL SERVICE CONSUMER BANKING SYSTEM AND SYSTEM AND METHOD FOR OPENING AN ACCOUNT

[75] Inventors: Lawrence Weiss, Skaneateles; Marylou Dowd, Massapequa, both of N.Y.

[73] Assignee: Citibank, N.A., New York, N.Y.

[21] Appl. No.: 473,975

[22] Filed: Jun. 7, 1995

[51] Int. Cl.[6] ....................................................... G06F 17/60
[52] U.S. Cl. ........................... 235/379; 235/381; 902/22; 902/24
[58] Field of Search ...................................... 235/379, 380, 235/381, 375, 382, 382.5, 492, 493; 902/4, 5, 14, 20, 22, 24–27, 32; 380/21, 23–24

[56] References Cited

U.S. PATENT DOCUMENTS

| | | | |
|---|---|---|---|
| 4,346,442 | 8/1982 | Musmanno | 364/408 |
| 4,376,978 | 3/1983 | Musmanno | 364/408 |
| 4,597,046 | 6/1986 | Musmanno et al. | 364/408 |
| 4,674,044 | 6/1987 | Kalmus et al. | 364/408 |
| 4,694,397 | 9/1987 | Grant et al. | 235/379 |
| 4,774,663 | 9/1988 | Musmanno et al. . | |
| 4,991,199 | 2/1991 | Parekh et al. . | |
| 5,008,927 | 4/1991 | Weiss et al. . | |
| 5,025,373 | 6/1991 | Keyser, Jr. et al. . | |
| 5,144,115 | 9/1992 | Yoshida | 235/379 |
| 5,195,130 | 3/1993 | Weiss et al. . | |
| 5,220,501 | 6/1993 | Lawlor et al. | 364/408 |
| 5,270,922 | 12/1993 | Higgins | 364/408 |
| 5,321,840 | 6/1994 | Ahlin et al. . | |
| 5,485,370 | 1/1996 | Moss et al. | 364/408 |
| 5,611,052 | 3/1997 | Dykstra et al. | 395/238 |
| 5,646,115 | 7/1997 | Schrader et al. | 395/233 |
| 5,659,165 | 8/1997 | Jennings et al. | 235/379 |

OTHER PUBLICATIONS

"Bank developing ATMS that make stock trades," Bank Letter, v.8,n38, (abstract only). Sep. 24, 1984.
"ATMs May Give Banks Added Firepower in Funds War," American Banker, vol. 158, No. 77. Apr. 23, 1993.
"Trade It Yourself Bank Machines Make a Debut," Los Angeles Times, Home Editition, Business section, p. 1, co. 5. Oct. 6, 1994.

*Primary Examiner*—Curtis A. Kuntz
*Assistant Examiner*—Binh K. Tieu
*Attorney, Agent, or Firm*—George T. Marcou; Kilpatrick Stockton LLP

[57] ABSTRACT

An integrated financial system that includes a single customer account that permits a customer to perform various financial transactions. The account includes at least banking components and brokerage components. A consistent user interface means is provided to allow a customer to access the account from a different sources including at least an automatic teller machine, a phone and a personal teller transaction. The account is flexible enough to include a variety of other components such as a credit card component, a line of credit component, a secured credit component and a money market component. A system and method for opening a single integrated account for a customer in a single session is also described.

23 Claims, 43 Drawing Sheets

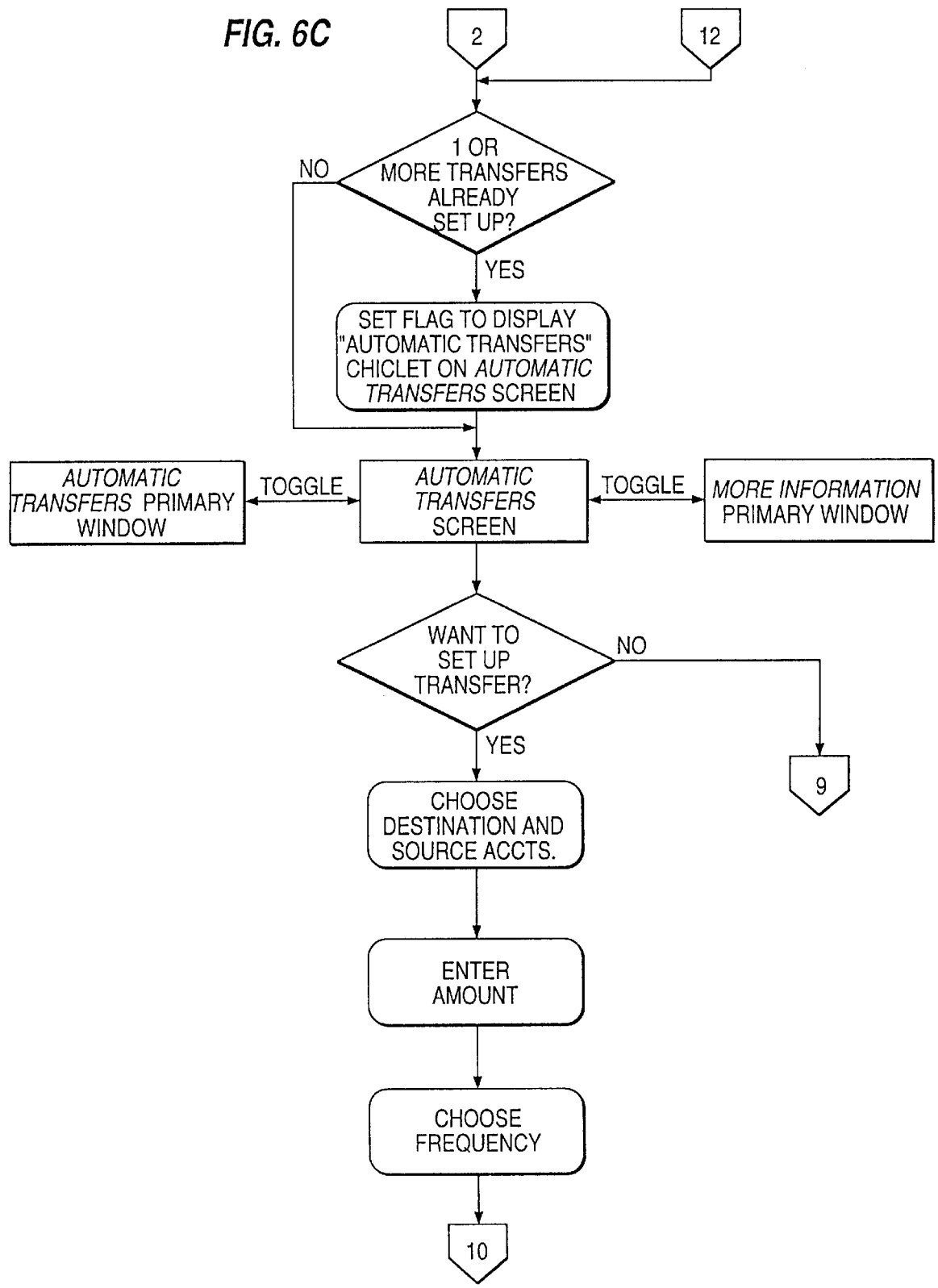

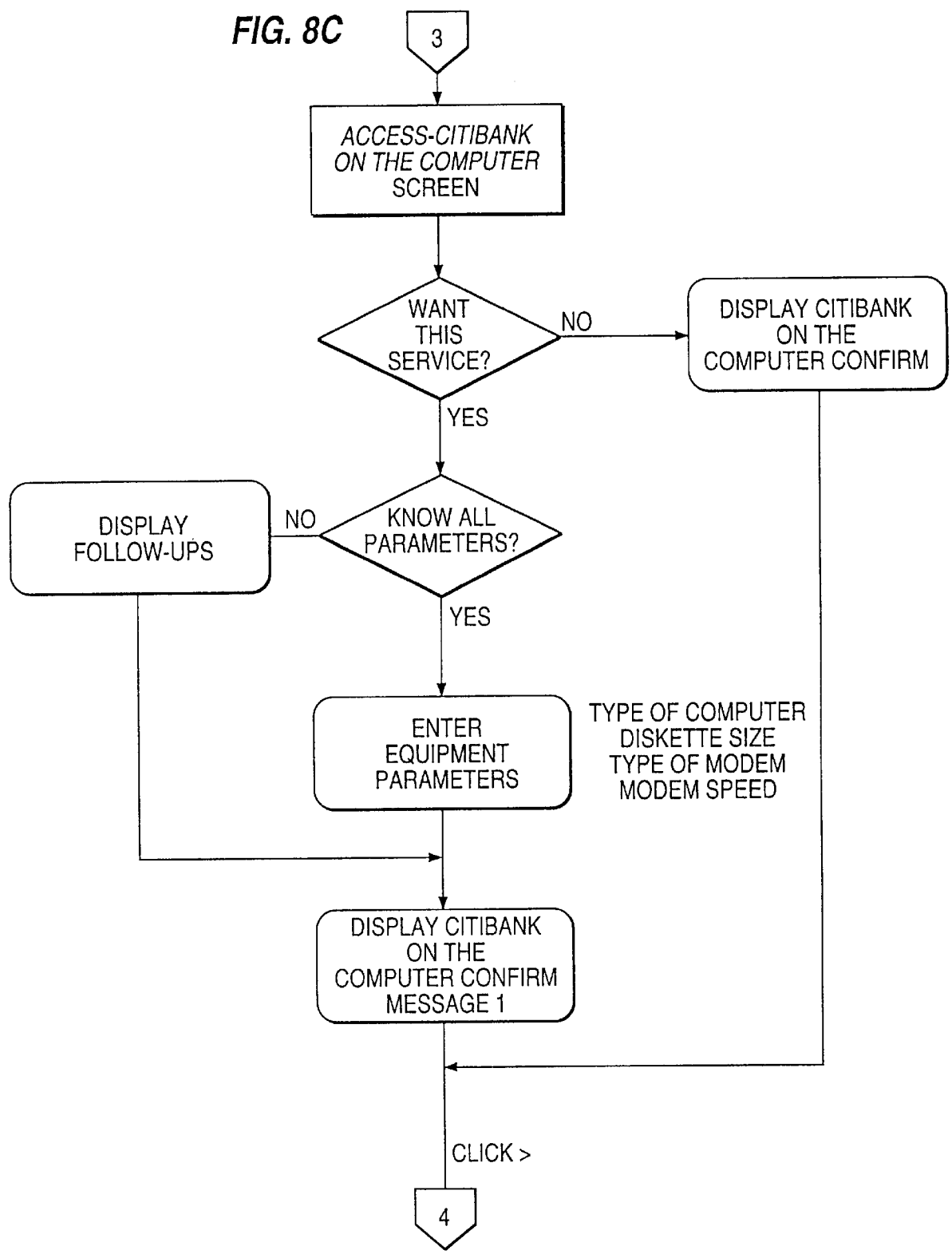

FIG. 10A

James Morrison
123 Main St.
New York, NY 10001

HERE IS YOUR CITIBANK ACCOUNT AS OF NOVEMBER 8, 1994

YOUR MONEY IN THE BANK

| | BALANCE |
|---|---|
| CHECKING | $ .00 |
| SAVINGS | .00 |
| INSURED MONEY MARKET | .00 |
| CDS | .00 |
| RETIREMENT | .00 |
| | $ .00 |

SECURITIES (NOT FDIC INSURED)

| | MARKET VALUE |
|---|---|
| BROKERAGE | $ .00 |

TOTAL $ .00

BORROWING AND LOANS

| | YOUR BORROWING POWER | AMOUNT AVAILABLE | AMOUNT YOU OWE |
|---|---|---|---|
| PERSONAL LINE OF CREDIT | .00 | .00 | .00 |

CREDIT CARDS

| | | | |
|---|---|---|---|
| CITIBANK CREDIT CARD | | .00 | .00 |

ALT<-  ALT-HOME

*FIG. 10B*

James Morrison

☑ CHECKING

AMOUNT $ ____.00          NICKNAME ____

YOUR MONEY IN THE BANK

☒ CHECKING

☐ CHECKING WITH INTEREST
$6,000 MINIMUM BALANCE

INTEREST RATE       2.90%
ANNUAL % YIELD     2.94%

SECURITIES (NOT FDIC INSURED)

BORROWING AND LOANS

CREDIT CARDS

☑ MORE INFORMATION

- YOUR MONEY IS ALWAYS AVAILABLE
- UNLIMITED DEPOSITS AND WITHDRAWALS

FIG. 10C

James Morrison
123 Main St.
New York, NY 10001

HERE IS YOUR CITIBANK ACCOUNT AS OF NOVEMBER 8, 1994

YOUR MONEY IN THE BANK

| | | BALANCE |
|---|---|---|
| CHECKING | $ | 5,000.00 |
| SAVINGS | | .00 |
| INSURED MONEY MARKET | | .00 |
| CDS | | .00 |
| RETIREMENT | | .00 |

SECURITIES (NOT FDIC INSURED)

| | | MARKET VALUE |
|---|---|---|
| BROKERAGE | $ | 5,000.00 |

| TOTAL | $ | 5,000.00 |
|---|---|---|

BORROWING AND LOANS

| | YOUR BORROWING POWER | AMOUNT AVAILABLE | AMOUNT YOU OWE |
|---|---|---|---|
| PERSONAL LINE OF CREDIT | .00 | .00 | .00 |

CREDIT CARDS

| | | | |
|---|---|---|---|
| CITIBANK CREDIT CARD | | .00 | .00 |

ALT<-  ALT-HOME

INTEGRATED FULL SERVICE CONSUMER BANKING SYSTEM AND SYSTEM AND METHOD FOR OPENING AN ACCOUNT

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

Reference is made to commonly owned co-pending application entitled "METHOD AND SYSTEM FOR PROVIDING INTEGRATED BROKERAGE AND OTHER FINANCIAL SERVICES THROUGH CUSTOMER ACTIVATED TERMINALS," Ser. No. 08/483,710, filed herewith (Attorney Docket No. 107045.004), the disclosure of which is incorporated by reference herein.

FIELD OF THE INVENTION

The present invention relates generally to financial transaction systems, and in particular, to an integrated full service consumer banking system and a system and method for opening a single account that allows customers to access a full range of global financial services using a variety of access points.

BACKGROUND OF THE INVENTION

In recent years, financial institutions have become increasingly diversified. Banks, for example, now offer a wide variety of products and services not previously available. These new products and services fall into two broad categories—new technologies for interacting with the financial institution and new financial services or "PRODUCTS" offered by the financial institution.

Innovative technologies for interacting with banks include the now ubiquitous automatic teller machines and customer activated terminals (ATMs and CATS) and, more recently, screen phones, personal computers configured for banking, personal digital assistants, voice response systems, and smart cards. Technology in existence today allows bank customers to access their banks from any place at any time. Notwithstanding these technical advances few bank customers take advantage of the full range of access points.

Financial institutions have also begun to offer a broader range of traditional banking accounts as well as investment and financial services. The traditional marketing approach of banks has been to try to enroll customers in new accounts, typically checking or savings accounts. Then, when the bank offers additional financial products or services, the bank tries to cross sell new accounts to customers having existing accounts with the bank.

One barrier caused by traditional account opening and cross selling of new accounts is that the customer must repeatedly provide the bank with the same data. This is very inconvenient and inconvenience is a significant obstacle in marketing of financial services.

Financial service is very much an inertia business. Once a customer opens an account, he or she is unlikely to change that account because of the effort involved. Most people don't shop for financial services. Instead, something in a customer's life occurs to cause a customer to make a change or be open to a change. There are moments in life when inertia is overcome; either by moving, death, formation of a family, a customer gets so angry at something that the customer decides to make a change, or other event occurs. Thus, at the moment a customer opens an account they are open to new components, but it is difficult to open a customer up again. For this reason, cross selling financial services is very difficult. Once a person has a set of accounts, then something's got to happen in their life to cause them to open up another account.

To overcome these obstacles, the focus of the present invention is to build a relationship with the customer rather than opening stand alone accounts for the customer. Studies have shown that as a customer's relationship with a bank broadens, the customer's balances increase. The present inventors have found that one way to establish a long term relationship with a customer involves opening a single account in which the customer has access to a full range of services at once.

There have, of course, been attempts to provide linked account structures in the past. The Citicard account, introduced in 1976 and 1977, was the first account that allowed four or five accounts to be mechanically linked together. A simple transactional account, short term savings, day-to-day savings, and 90-day savings, checking and checking plus line of credit were all linked in the Citicard account. Over the next ten years, other banks copied this approach and began offering "linked accounts," which are essentially transactional banking accounts with some saving components and perhaps a line of credit—a very traditional banking product.

Another significant development was the asset management accounts offered by certain brokerage firms. These accounts offered a plurality of securities components in a single account. The brokerage firms were not, however able to offer traditional banking services. One example is Merrill Lynch's cash management account (CMA). Aspects of this account are described in U.S. Pat. Nos. 4,346,442 to Musmanno; U.S. Pat. No. 4,376,978 to Musmanno; U.S. Pat. No. 4,597,046 to Musmanno et al.; U.S. Pat. No. 4,674,044 to Musmanno et al.; U.S. Pat. No. 4,774,663 to Musmanno et al. and U.S. Pat. No. 5,270,922 to Higgins. The account offered by Merrill Lynch was limited to securities transactions and did not include full banking products.

Similarly, when a customer opens a brokerage account, there is no need to open a separate account for trading equities or for trading fixed income.

The next development in the evolution of Citibank's account was the so-called asset network account that included a full range of brokerage services and, in addition, full banking services. This form of account originally known as FOCUS has become known as the CitiGold Account. This account, like brokerage accounts, was intended for sophisticated investors. The central feature of the account was sweeping funds into a money market account on a daily basis. Such an account is not, however, suitable for a broad market account that includes unsophisticated investors. The CitiGold Account also did not include credit cards as a component of the account. The CitiGold was an elite account intended for sophisticated investors.

The CitiGold Account system introduced the idea of integration and consistent presentations across the entire range of customer access points, including ATM machines, automated voice response systems, phone operators, staff screens, home banking on a computer, home banking on a screen phone, etc. In other words, in every contact with the financial institution, the customer sees the same presentation of the account and the same capability to do the transactions.

Another step in the evolution of the Citibank account was the CitiOne account, introduced in the early 1990's. This account permitted linking of transaction accounts, certain traditional banking accounts and bank saving accounts so the customer could access all these accounts. In some regions the CitiOne account included securities or loan services such as line of credit services.

With the Citione account, customer's accounts could be linked together randomly so that the financial institution's different products and services could be linked together and appear on a customer's statement. This was done on an ad hoc basis depending on a customer's desires. The basic features available in the United States were checking, day-to-day savings, and insured money market accounts, certificates of deposit (CDs) and credit cards.

The next step in the evolution was the Citibank Money Management Account (CMMA), introduced around January 1993. The CMMA allows customers to link separate accounts and to perform a wide variety of financial transactions including traditional banking activities, brokerage activities and loan activities. Again, individual customer accounts could be linked to form an ad hoc mixture of product features. The system categorized those features within categories such as "your money in the bank," "securities," "borrowing and loan," "credit cards" and the like. Among other things, the CMMA allows banking customers the convenience of "one-stop" shopping. Efforts were also made to provide consistent presentation. For example, on the screen phone and in personal computing banking, the top menu was made to look like the same menu on an ATM machine. However, after the initial screen, the systems diverged.

Notwithstanding the opportunities offered by the Citione and CMMA accounts, there is still significant room for improvement. Specifically, the present inventors recognize that while some of the infrastructure is in place, the understanding and concept of a single account that includes all of these features has not yet been achieved. The accounts were still linked on an ad hoc basis and customers were required to open up individual accounts. This required effort in educating customers about these accounts and in selling these accounts.

As with technological advances in remote delivery products, these new accounts offer the possibility of realizing improved customer services and significant operating efficiencies and reduced cost. Again, however, the potential benefits to be obtained from using an integrated financial system such as the Citibank Money Management Account have not yet been fully realized.

There are several deficiencies in currently available financial systems that might contribute to the less than full realization of the benefits offered by new technologies and services. To begin with, existing systems are not as user friendly as they could be. Although customers are able to access the system in a variety of ways, doing so requires that the customer possess certain skills, e.g., computer literacy, or a degree of technical competence that not all potential customers possess. Thus, there is a need to simplify the system for accessing the variety of services.

In addition, customers are not always aware of the variety of services offered by a bank. While banks frequently advertise and promote such services in their branches and elsewhere, not all customers pay attention to or are receptive to such promotional activities. Perhaps more significantly, the promotional efforts do not necessarily reach the customer at the time that they are open to change.

Thus, there remains a need for an improved integrated system for providing financial services. More specifically, there remains a need for an improved system for accessing a financial institution and for setting up customer's accounts within a financial institution.

SUMMARY OF THE INVENTION

The present invention provides an improved system for seamlessly accessing an integrated financial system. The single account of the present invention is a broad market account intended for a very wide range of people. The account provides full investment capability, full banking capability, bill payment capability, lending capability—basically everything a customer would financially need to do. The account can include provision for insurance and retirement accounts as well. The present invention is characterized by the integration of a variety of services and a system and method for making those services available to customers. In this way, all services are available to a customer at every access point in a consistent manner.

To improve acceptance of such an account, it is helpful to have a consistent interface across access points. The consistent interface simplifies maintenance, but is even more important from a customer point of view. As a bank offers more products, the bank must make it easier for customers to use the new and existing products. A consistent user interface promotes quick familiarity with new products and technologies.

In one preferred embodiment of the present invention, the broad categories of components to be included are investment services, transactional banking services (bank investments insured money rate accounts and certificates of deposits), securities (equities, derivatives, mutual funds), annuities, secured loans, unsecured loans, and credit cards. The account may also include insurance components including property, health and life insurance components. The account may further include retirement components including 401K components and IRA components all segregated on a tax basis.

Thus, the system of the present invention has three principal characteristics. First, the system permits customers to access a financial institution through a variety of ways, including automatic teller machines, screen phones, personal computer, voice phones and the like. Second, the system provides a consistent customer interface.

Another difference is that the single account of the present invention is more comprehensive than previous accounts, For example, the account of the present invention includes a credit card component, a brokerage component and the possibility of insurance and retirement components. All services of the bank are included within the single account of the present invention, not just a selection of services. In addition, the single account of the present invention can be offered globally wherever there is a bank branch.

The present invention also provides a system for opening the account at a single session that includes means for collecting data concerning customer's financial and/or investment situation, means for performing a needs analysis based on the data collected, means for displaying account information, means for making recommendations based upon the needs assessment, means for inputting a customer's component selection, means for adding account components to a single account to build a single account that provides all the services desired by the customer and best satisfies the customer's needs, means for performing a credit check, means for determining a single fee based upon services provided, means for authorizing a customer's use of remote access products including means for issuing a bank card and personal identification code; means for identifying missing data and means for prompting the user to enter data that has not been provided. The system also includes means for linking data fields in each component such that once a piece of data is collected, the data is provided to all appropriate data fields. In addition, the system is constructed such that the user can bypass a data field and provide the data later in the session.

An important aspect of the system of the present invention is that it permits data to flow up and down through the process so that once a salient piece of data is collected, the data is transmitted to every location where it is needed. In other words, all similar data fields are linked. This provides several advantages. First, the user (bank employee) never has to ask the customer for data that has previously been provided—even if some other user collected the data. Secondly, the system users have flexibility to collect data at an appropriate time in their presentation to the customer.

The system of the present invention also preferably includes a pending file storage means for storing salient data that has been collected, but is not immediately needed. In this way, if the data is needed during a subsequent visit by the customer to the bank, the data can be retrieved without asking the customer to provide data that she or he has already provided.

In addition, the system allows the customer to interact with a financial institution that provides a variety of services through many different means including automatic teller machines, screen phones, voice phones, personal computers, branch tellers etc. without having to learn a new system. In other words, the system always provides a consistent consumer interface. The ideal system is an account that manages all the customer's money and allows the customer to perform all transactions around the clock and around the world. In this way, a customer may choose whether to visit a bank in person, call the phone, or use a computer, the services available are all the same without altering the customer's experience. Every access point is just another window into the financial services accounts.

Because the system is fully integrated, it provides operating efficiencies and cost reduction. This, in turn permits the financial institution to pass cost savings along to the customer which, in turn, strengthens customer loyalty and promotes relationship building. In effect, the present invention promotes a cycle of increased efficiency and cost savings that benefits both the financial institution and the customer and tends to bind the customer to the financial institution more closely in a way that benefits both the customer and the financial institution.

From the financial institutions point of view, the system, by offering the customer advantages, promotes customer loyalty and relationship building. The present invention shifts away from cross selling and convincing customers to sign up for new accounts and instead provides the entire range of services in a single account so customers merely have to be convinced to use what they already have.

The one-step relationship opening system and process produces obvious efficiencies, but has even more significant advantages in terms of customer loyalty and reduction in customer attrition. From the customer's point of view, upon opening of the single account, they have a comprehensive financial relationship with the bank, not just a single account with the bank. The customer immediately has access to a wide range of financial services that they can use very quickly.

The account of the present invention is intended for a broad range of customers. As such, one critical aspect of the present invention is the provision of fire walls to make certain that customers understand the difference between securities and FDIC insured money in the bank. It is also necessary to prevent unintended commingling of uninsured securities with federally insured deposits. Thus, the present invention provides a balance of a single account with careful fire walls between securities and insured deposits.

Thus, one aspect of the present invention is an integrated financial system that includes a single customer account that permits a customer to perform various financial transactions including at least banking transactions and brokerage transactions; a user interface means for allowing a customer to access the account from a plurality of different sources including at least an automatic teller machine, a phone and a personal teller transaction and means for presenting a consistent user interface substantially throughout each transaction regardless of the source used to access the account. The account is flexible enough to include a variety of other components such as a credit card component, a line of credit component, a secured credit component and a money market component.

Another aspect of the present invention is the provision of a method of opening a single integrated account for a customer in a single session that includes the steps of building a database containing a customer profile that includes demographic information and customer financial information such as credit information and financial goals; performing a needs analysis based on information collected; recommending an account based on the needs analysis and presenting information concerning the component of the selected account to the customer; displaying an image of a bank statement; updating the database to reflect a customer's selection of at least one account component, displaying a second image of a representation of a bank statement which image is revised to reflect the customer's selection and printing at least one enrollment form.

The present invention also provides a system for opening an account in one session in an integrated financial system of the type comprising a single account that includes at least a checking component, a savings component and a brokerage component. The system includes means for assembling a personal profile that includes means for collecting salient data; means for building a single customer account that includes means for building at least a checking component, a savings component and a brokerage component and means for allowing data collected at any step of the process to flow to all other points where the data is required so that data need not be entered more than once. Preferably, each component of the single account includes data fields and the system further comprises means for transferring data between the data fields and means for entering data fields in different components that are related such that data entered in one data field can be copied into other related data fields.

The system may also include means for generating multiple prompts for certain pieces of data such that the user may exercise personal judgment concerning the appropriate time to collect such data and pending file means for storing information that is collected, but not immediately needed. The system also preferably includes means for building various other account components including a credit card account component, a line of credit account component, a secured credit account component, a money market account component, an insurance account component and a retirement account component.

Finally, the system includes means for displaying a representation of a bank statement that is connected to the means for building a single account whereby as the account is built the representation of the bank statement is updated.

BRIEF DESCRIPTION OF THE DRAWINGS

FIGS. 5A–5M are a flow chart showing the preferred process for performing the step of building an account in the method of FIG. 2.

FIGS. 6A–6G are a flow chart showing the process involved in the step of account services in the method of FIG. 2.

FIGS. 8A–8F are flow charts showing the preferred process of performing the step of setting access levels according to the method of FIG. 2.

FIGS. 10A–10C depict examples of statement facsimile screen displays generated by the system of the present invention.

DETAILED DESCRIPTION

Reference will now be made in detail to the preferred embodiment of the invention, an example of which is illustrated in the accompanying drawings. It should be noted that, as used herein, the term "user" typically refers to a bank employee (such as a personal banker, elite account consumer banking executive, or consumer bank telephone service center representative) working with a new customer. Also, the term "bankcard" as used herein refers to a bank access card such as a Citicard, not a credit card.

Figure 1:
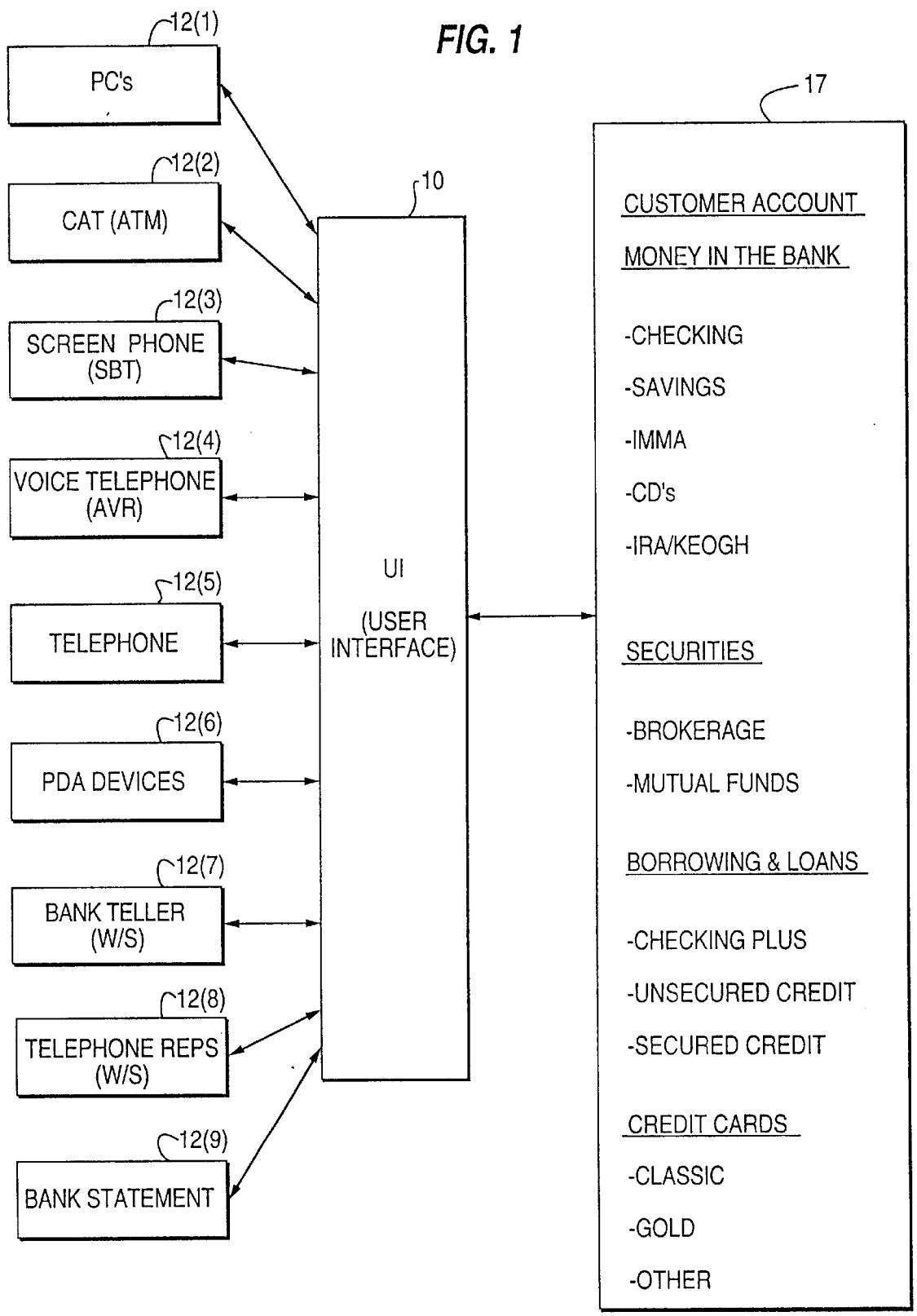
FIG. 1 is a high level view of the integrated banking system of the present invention.

FIG. 1 provides a high level overview of the integrated account system of the present invention. Central to this system is the provision of a single customer account 17 that includes a variety of components enabling the customer to perform a wide variety of financial transactions. These transactions may be grouped into general categories such as money in the bank, securities, borrowing and loans and credit cards. In the preferred embodiment of the present invention, the general categories mentioned above are intended to encompass the following components: investment services, transactional banking services (bank investments, insured money rate accounts and certificates of deposits), securities (equities, derivatives, mutual funds), annuities, secured loans, unsecured loans, and credit cards. The account may also include insurance components including property, health and life insurance components. The account may further include retirement components including 401K components, IRA components all segregated on a tax basis.

The system further includes a user interface 10. FIG. 1 graphically depicts the user interface 10 as a single element to illustrate an important aspect of the present invention, namely that a consistent user interface is presented to the customer regardless of how they access the system. The implementation of the user interface 10 will, however, likely take several different forms. For example, in the case of personal computer, screen phone, customer activated terminal (CAT) or the like, the user interface may include an integrator and various other known hardware systems. Ordinarily, for example, separate hardware interfaces are used for remote delivery products and CATs. On the other hand, when the customer accesses the system in person or by telephone, the user interface is typically a human teller, personal banker or telephone representative. To maintain consistency, the teller is prompted by a work station screen. Thus, the user interface means of the present invention may be in the form of a visual display, an audio display or a bank employee following a system script. Again, the hardware interface between the branch (for teller services) is quite different from the hardware interface for remote access devices (PC's, Screenphones, PDA's). But, consistent with the present invention and regardless of the structural form of the user interface, the presentation that the user sees is consistent.

As shown in FIG. 1, the user interface may be accessed by customers through a variety of access points 12(1, 2, ... n). These touch points include a personal computer (PC) 12(1), a consumer activated teller (CAT), or ATM machine 12(2), a screen banking telephone (SBT) or screen phone 12(3), a voice phone using automatic voice response (AVR) 12(4), a touchtone or PBX phone 12(5), a personal digital assistant (PDA) 12(6), teller or personal banker using a workstation 12(7) and a bank telephone representative (USCC) using a work station 12(8). The bank statement 12(9) is also a form of access point where the user comes into contact with the bank. In short, the system provides a wide variety of access points for accessing a consistent user interface that permits entry into an account that provides a full range of financial services.

The integrated system of the present invention plainly provides opportunities for improved customer loyalty and increased efficiencies for the bank. To take advantage of these opportunities, however, a bank must be able to get its existing and new customers to use the system.

Thus, another important aspect of the present invention is provision of a system and method for opening a single account that includes a full range of financial components. This process, sometimes referred to as a one-step account or relationship opening includes several general steps or stages. These are: account selection, needs assessment, building a personal profile, building the customer account, selecting customer services, enrolling the customer in remote access services, printing an enrollment form, issuing a bankcard, determining the identity and number of persons having access to an account and finally, suitable follow-ups.

The means for accomplishing these steps include a specially programmed general purpose computer, a modem, a printer and a card embosser. The computer is programmed to provide a variety of integrated accounts that are effectively (but not actually) "hard wired" to one another rather than linked on an ad hoc basis. More generally, the system includes means for collecting data concerning a customer's financial and/or investment situation, means for performing a needs analysis based on the data collected, means for displaying account information, means for making recommendations based on the needs assessment, means for inputting a customer's component selection, means for displaying a facsimile or representation of a customer's bank statement, means for adding account components to build a single account that provides all the services desired by the customer and best satisfies the customer's needs, means for updating the display of facsimile representation of a customer's bank statement, means for performing a credit check, means for determining a single fee based on services provided, means for enrolling a customer in remote access services including means for issuing a bank card and personal identification code; means for identifying missing data and means for prompting the user to enter data that has not been provided.

Figure 2A:
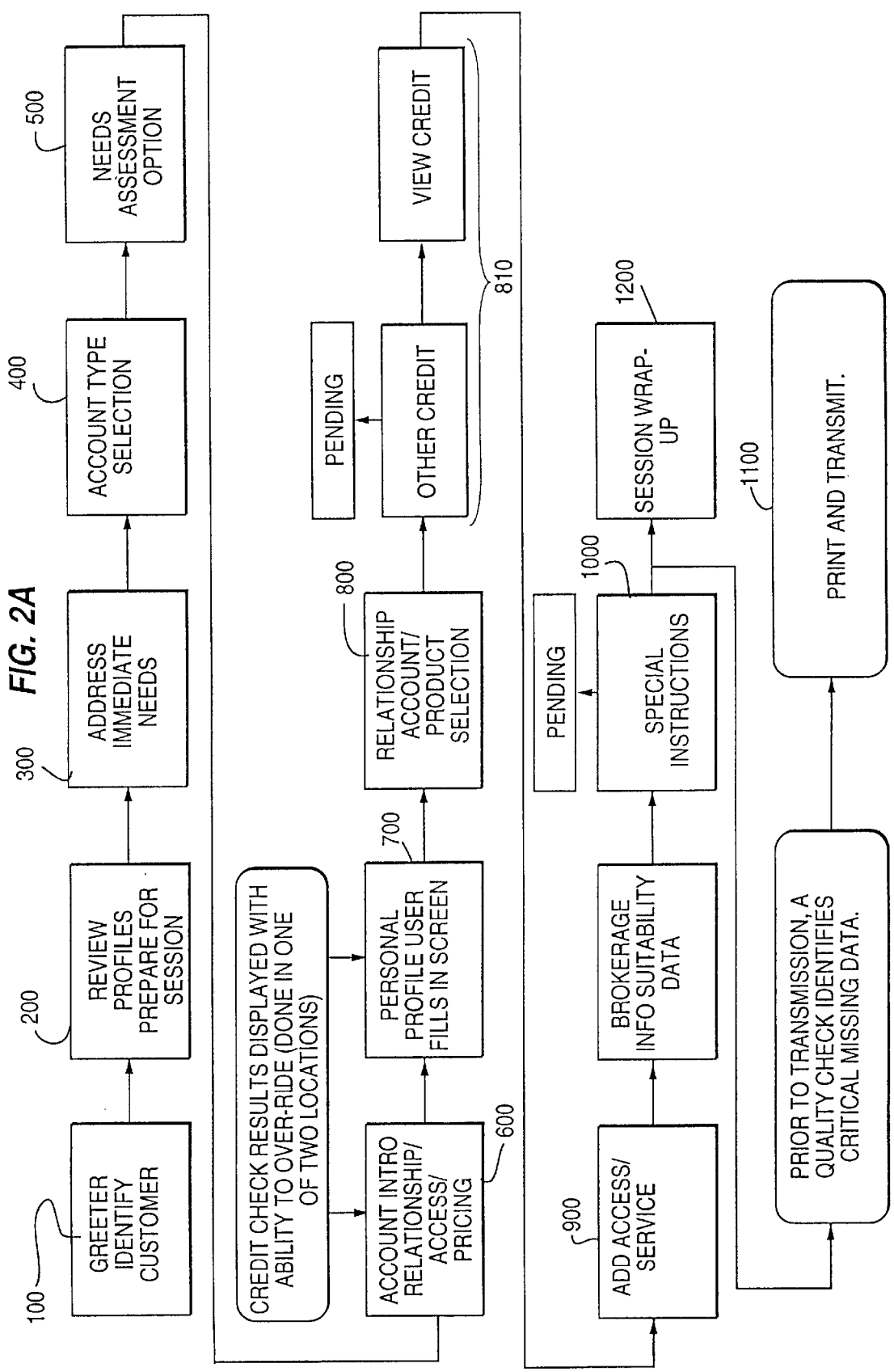
FIG. 2A is a block diagram showing the steps in a preferred embodiment of a method of opening an account with a new customer in the integrated financial system of the present invention.
Figure 2B:
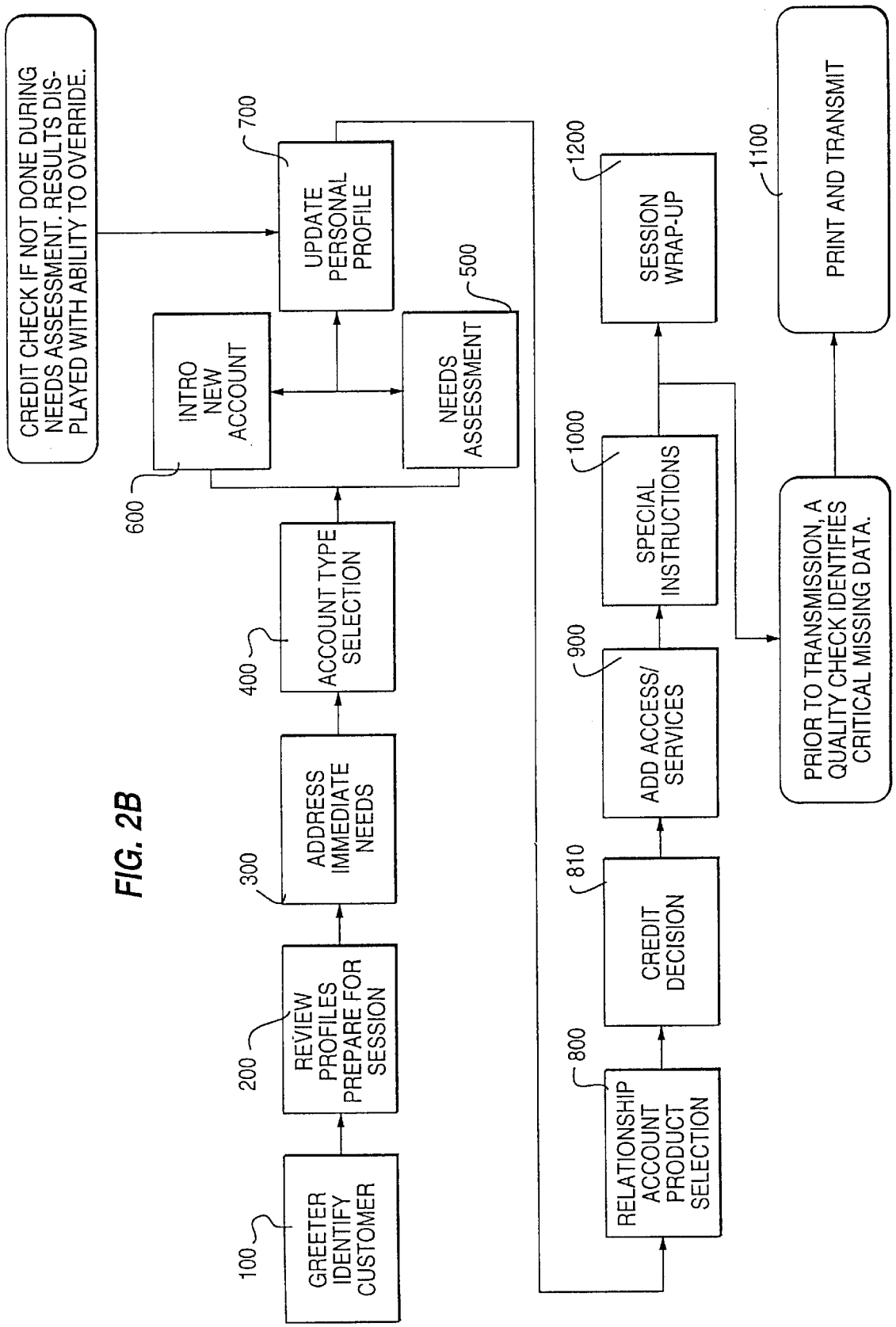
FIG. 2B is a block diagram showing the steps in a preferred embodiment of a method of opening an account with an existing customer in the integrated financial system of the present invention.

FIGS. 2A and 2B show one currently preferred sequence of the process of the present invention at a high level. Specifically, FIG. 2A shows the process for a new customer and FIG. 2B shows the process for an existing customer. The processes are naturally quite similar. The differences reflect the fact that the bank already has basic information concerning existing customers and the fact that existing customers typically have some familiarity with the services and access devices offered by the bank. In a more general sense, the differences in the process steps reflect the difference between account creation and account conversion. As explained below, the sequence of the particular steps can vary without departing from the central objective, namely one step account opening. The preferred embodiment of the system for performing the steps of FIGS. 2A–2B is detailed in flow charts shown in FIGS. 3A–9B.

CUSTOMER IDENTIFICATION (GREETER) SYSTEM AND STEP (100)

An optional, but useful step in the method of one step relationship opening is an initial screening step that is sometimes referred to as the greeter step. The purpose of this step is to gather preliminary customer information and ascertain the purpose of the customer's visit.

Upon contacting the bank, typically by entering a branch, a customer is greeted and entered into a queue. This initial greeting step is useful for identifying new customers. For a new customer, name, address, and purpose of visit will be requested. For existing customers, the customer is identified in several different ways: by account number, name (either alone or with address and zip code), social security number, and bankcard, either by entry of the number or by bankcard dip and personal identification code (PIC) entry. The system includes means such as a specially programmed general purpose computer or workstation and an input device (such as a keyboard, card reader, mouse or touch screen) that allows the user to input data obtained from the customer.

The greeter then creates (in the case of a new customer) or calls up (in the case of an existing customer) a profile that allows the (the teller or personal banker) to know as much about the customer as is available; including, but not limited to, information on credit cards, mortgages, tax shelters, etc. The system of the present invention preferably allows different levels of access depending on the needs of the user and desired customer flow. For example, a greeter or teller typically has limited access because the bank would like them to complete transactions as quickly as possible. A personal banker, on the other hand, generally spends more time with the customer and should therefore have greater access. If a preliminary identification profile is not captured by a greeter, the system will prompt the next user to capture the preliminary profile before doing a credit check. Thus, the system allows this initial information to be gathered at one of two steps. Specifically, the system of the present invention is programmed to permit data input in connection with one step to flow up or down into others (and preferably all) relevant data fields for use in other, and preferably all steps.

The initial greeting step 100, though not a necessary step in the system of the present invention, is helpful in achieving the objective of making the process as easy as possible for the customer by not asking for information that the customer has already provided. The greeter can also determine the purpose of the customer's visit, redirect the customer to access alternatives and, when feasible, fulfill immediate needs. The initial greeter step also makes it possible for the next user to prepare for the customer as discussed below.

REVIEW PROFILE SYSTEM AND STEP (200)

Before meeting with the customer, the user (personal banker) should review the customer profile to prepare for the sales conversation. The system preferably includes a general purpose computer and/or networked work stations for this purpose. The computers or workstations should, of course, include some type of display. The principal objective of the profile review is to prepare for a sales session with the customer.

ADDRESS IMMEDIATE NEEDS SYSTEM AND STEP (300)

Customers sometimes come into contact with consumer banks for a very specific and simple reason that can be handled quickly and does not require close personal assistance. Examples include purchasing a certificate of deposit or U.S. Savings Bond. In such cases, the customer should be serviced as soon as possible. The system permits this by prompting the user to determine if the customer is interested in a simple transaction that can and should be handled immediately. For this step, the system includes a programmed general purpose computer or workstation with a display or other device for prompting the user.

ACCOUNT TYPE SELECTION SYSTEM AND STEP (400)

After the customer is greeted and immediate needs are taken care of, the customer is greeted by the next user (normally a personal banker) (if this wasn't done in Address Immediate Needs), and the customer profile continues on the same system. There will be some basic questions that the personal banker (also the user) can ask the customer to determine, in a general sense, the customer's financial needs and how to best help the customer. Specifically, the type of account the customer needs is determined (assuming the bank offers more than one class of account). The account opening flow is flexible enough to support a customer interested in opening one piece of an account, such as a certificate of deposit in a short amount of time, as well as a customer willing to spend a longer time discussing their financial needs and opening the various components of an integrated account that best suit them. To facilitate this step, the system includes a general purpose computer or workstation programmed to prompt the user to provide certain data, receive the data and send the data to all relevant fields. Again, the system also includes a suitable input device to allow the user to interact with the computer.

The discussion with the customer will also give the user (typically a personal banker or consumer bank telephone service center representative) a sense of the components within the integrated bank account of the present invention that the customer is explicitly interested in and the components that the user will need to sell to the customer. The system has flexibility to address the vast differences in customer interactions. To accommodate this need, the system is programmed to allow data to flow up and downstream to wherever it is needed and by checking at each step to see whether required data has already been received. A programmed general purpose computer is used for this purpose, but the computer operates as if the data fields for the account component were "hardwired" to one another. In this way, the data will be requested once and only once at the point in process the user finds most convenient. As discussed below, the system also provides a "pending file" for storing relevant information that is collected, but not immediately needed.

As shown in FIGS. 2A and 2B, the process after the account type selection step is slightly different for new customers and existing customers. Specifically, the process for a new customer presents each step in sequence. For existing customers, however, the user may elect to bypass either the account introduction or needs assessment step entirely. Again, this allows the user (personal banker) to exercise her or his judgement. For both processes, however, the step is essentially the same, as discussed below.

NEEDS ASSESSMENT SYSTEM AND STEP (500)

The needs assessment step is essentially a sales tool to allow the user and customer to choose the best account and account components for the particular customer's needs. A system used for the Needs Assessment step is flexible such that data can be provided in an order that is consistent with the sales expertise of the user or telephone service center rep and the expressed needs of the customer. Again, the system includes a computer programmed to accommodate this need by sending data, upstream or downstream, to all locations where it is required. In this way, the user can temporarily delay inputting critical data.

The needs assessment step involves inputting data in response to more detailed questions that identify specific customer needs and/or sales opportunities for the user. These questions will help the user customize the integrated bank account for the customer. The system is, again, programmed such that data input during this step will pass through to other relevant fields.

Figure 3A:
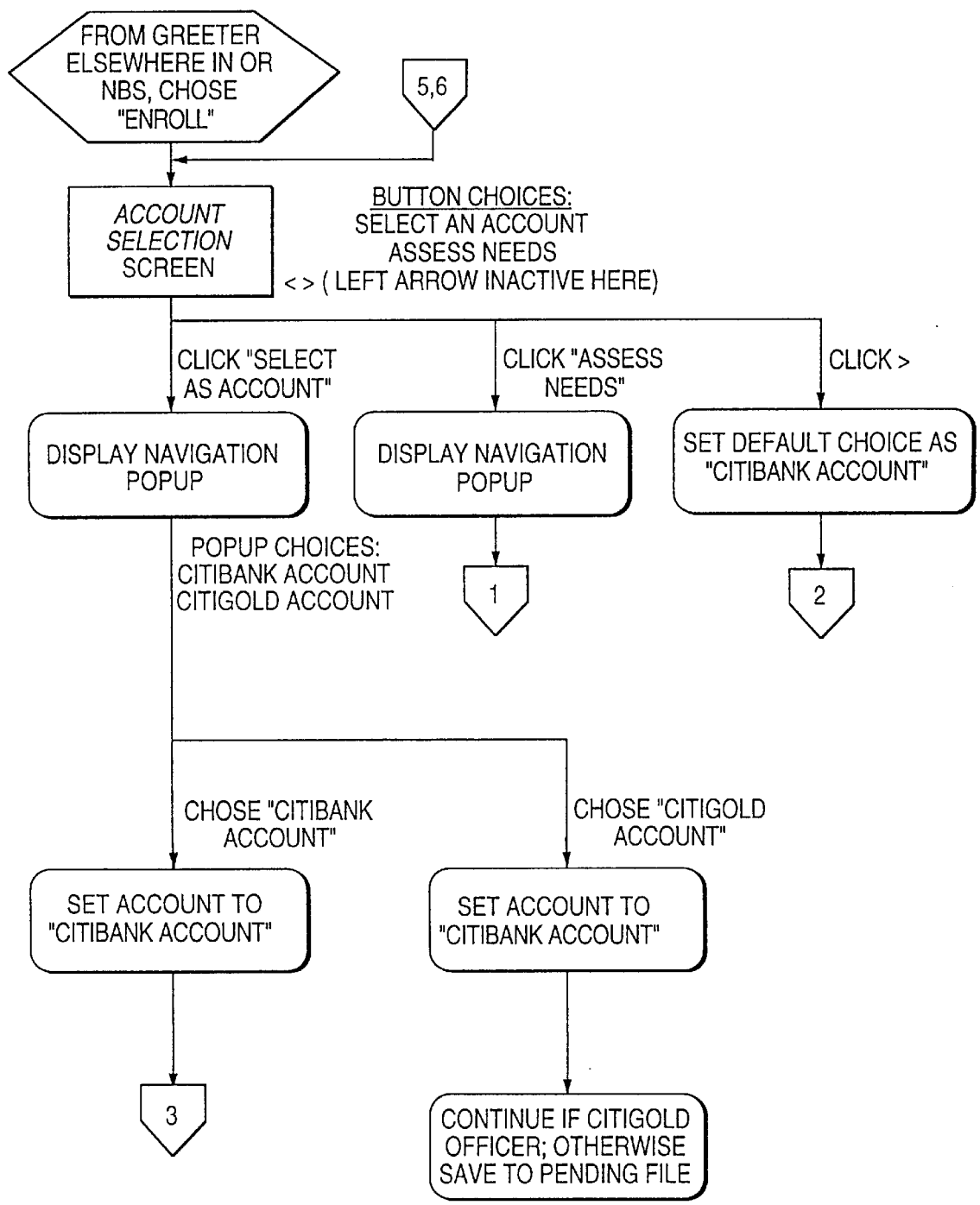
FIGS. 3A–3C are a flow chart showing the process involved in the step of account selections/needs analysis in the method shown in FIG. 2.
Figure 3B:
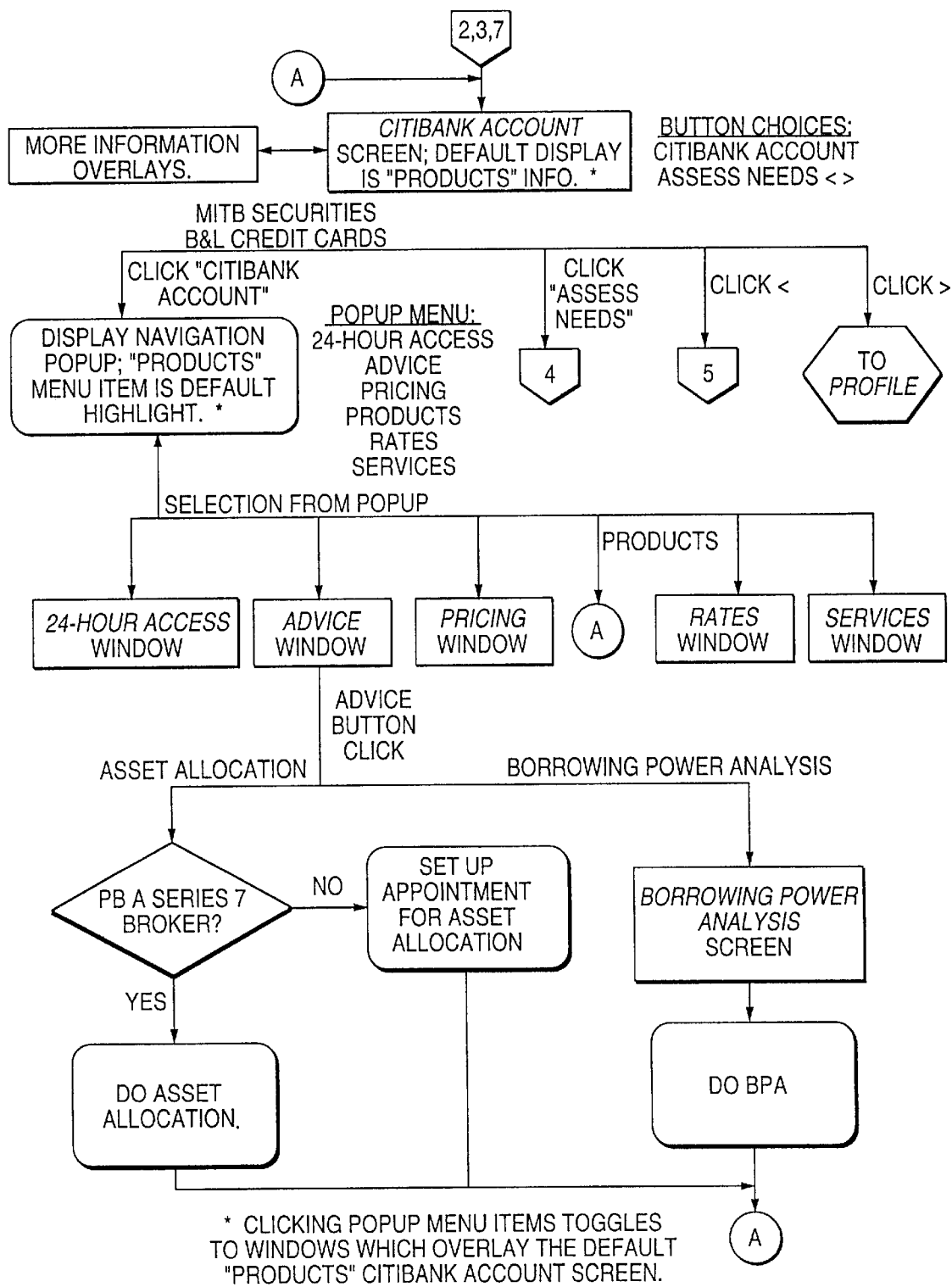
Figure 3C:
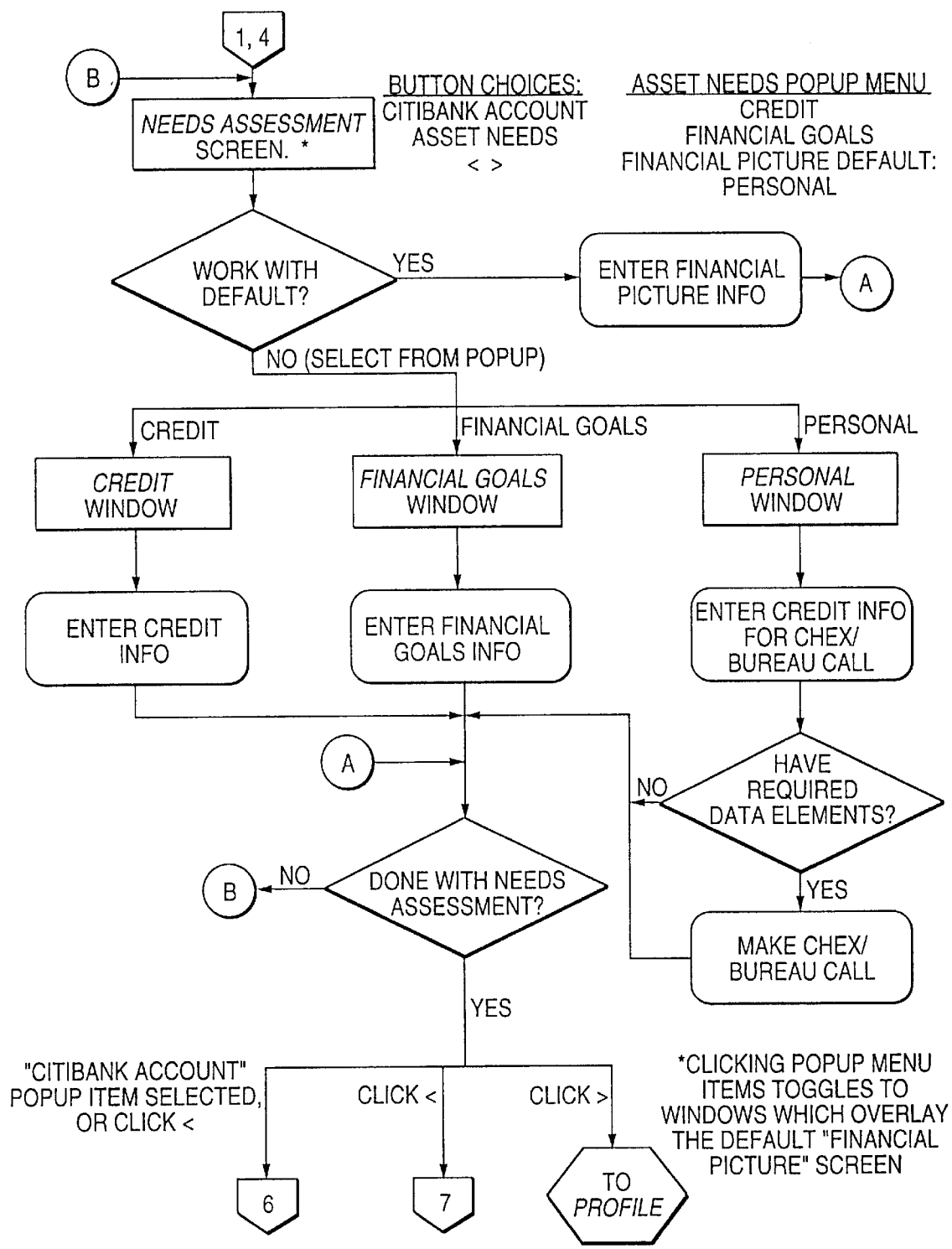

A description of one embodiment of the account selection and needs assessment steps is illustrated in FIGS. 3A–3C. The process may be easily understood by reference to the flow chart and FIGS. 3A–3C. However, several features should be noted.

As shown in FIG. 3A, once the user enters the account selection process, they are presented with a screen that provides a choice of selecting an account or assessing needs. Thus, if the customer is interested in a specific type of account, e.g., "Citibank" or "CitiGold" account, the process of needs analysis may be bypassed.

In the example illustrated in FIG. 3A, when the user chooses to "SELECT AN ACCOUNT", the user is presented with a listing of the available accounts to make a further selection. If, on the other hand, a needs analysis is desired, the user selects "ASSESS NEEDS" and the process detailed in FIG. 3C is followed. In the specific embodiment shown in FIG. 3A, a default selection of "CITIBANK ACCOUNT" can be selected as well.

FIG. 3C illustrates an example of the needs assessment process of the present invention. As shown therein, after the user decides to assess needs, they are presented with a menu that allows them to select a particular area, e.g., "CREDIT", "FINANCIAL GOALS", "PERSONAL" or by default, "FINANCIAL PICTURE". Depending on the selection made at this point, the user is prompted to provide information concerning the specific area selected or, in the case of the "FINANCIAL PICTURE" selection, information concerning a variety of areas. This process continues until the needs assessment is complete.

The process for providing product information is depicted in FIGS. 3B. As shown therein, this system allows the user to provide information relating to the specific areas of concern to the customer. The process can be repeated until all questions have been answered. At that point, the user may choose to proceed to the personal profile section.

Again, flexibility is an important aspect of the system of the present invention. The user may elect not to provide certain information if in her or his judgement the customer should not be asked to provide the information at that time. Thus, data input will not be required at this step, but some record is made if this step is bypassed so that data can be collected later.

Information captured during the Needs Assessment step is eventually stored in the customer's profile along with the answers to the basic Needs Assessment questions. In this way, other users (bank employees) will be able to access customer information no matter where the customer touches the bank.

As mentioned earlier, the system of the present invention includes a "pending file" for storing information that is collected, but not immediately needed. More specifically, the system preferably includes some form of electronically retrievable storage device.

The system can include a number of user sales tools, including a Borrowing Power Analysis that takes advantage of the data collected at this step. For example, a user will have the ability to display and print pricing information.

Other sales tools available include information concerning 24-hour access; financial advice; rates and services. The system is flexible enough to make all of these tools available while at the same time permitting the user to quickly bypass these sales tools in their entirety. To accommodate BPA pricing information and any other sales tool, the system includes a programmed general purpose computer and/or workstation.

ACCOUNT INTRODUCTION SYSTEM AND STEP (600)

For new customers, this step involves an introduction to the various types of integrated accounts offered by the bank. The components available and the monthly pricing are also preferably discussed. For existing customers, this step involves an explanation of the new integrated account.

In addition, a credit check is performed once the user obtains a clear indication that the customer intends to open an account. Typically, the credit check involves two separate steps—an initial screening to see whether the customer is among a list of bad customers, e.g., a CHEX screening, and second, a standard credit bureau report. To facilitate credit checks with outside services or agencies, the system preferably includes a modem or other communication equipment.

Ordinarily, the system will conduct both steps of the credit check at the same time, and the responses will be displayed on the same screen. However, in the event one response cannot be obtained (i.e., due to system problems), the other response is displayed and should not be withheld until the other becomes available. The system has the flexibility to enter only the basics needed for the credit check, i.e., name, address, social security number, date of birth, and citizenship and optionally, employment, income, and housing costs. If this identification data has not been obtained earlier it must be captured now. The system is flexible enough to excuse existing customers from this screening process if the last credit check (which is stored) was done within the past 12 months, for example. Also, the two steps of the credit check are executed separately and the system has the ability, given proper entitlement, to override the initial screening results. If the user has been able to obtain employment, income, and housing information, the system will be able to return a specific loan amount for whichever products are part of the credit-qualified offer. The credit qualified amount, if any, will display on the same screen that displays the credit check responses.

If the customer is not liability qualified, the system allows the user (typically authorized by the credit manager) to determine if the reason can be overridden and the account opened. If the account is opened, the circumstances of the waiver/override are captured and stored with the customer's demographic information. If the account is not opened, an "adverse action type" notice must be printed in the branch or the consumer bank telephone service center showing the name and phone number of Chex and/or the credit bureau from which the information was received and provided to the customer.

The outcome of the credit check and needs assessment is a specific recommendation of an account for components that will best serve the needs of the customer. The system provides the user with sales tools such as a screen or set of screens that will allow the user to clearly demonstrate the power of the integrated account, its components and how the customer can best access their accounts.

Again, the system includes a programmed computer and suitable input means for prompting the user and collecting data to perform this step.

PERSONAL PROFILE SYSTEM AND STEP (700)

Once the account selection/needs analysis step is complete, the system proceeds to the Personal Profile Step. During this step, the user will collect any other personal information that has not yet been completed. Because of the systems flexibility, the data collected here will vary depending on what was previously collected. Again, a computer with a suitable input device is used for this purpose. A modem or other communication equipment is preferably provided to allow the computer to communicate with outside credit bureaus, for example In some cases, the credit check will be executed during this step if not previously executed. Following personal information, any employment information that has not yet been collected will be completed. There will be one screen (per signer on the account) to capture personal information and one screen (again, per signer) to capture employment information. Information included on the employment screen will be name and address of current and previous employer, time at current and previous employer, occupation selector) from a pick list of catalogues. A field to input the method of employment verification, if performed, will be provided on this screen and, if input, will be transmitted to the credit bureau with the application so that the verification will not have to be performed when reviewing the credit decision.

The system for account opening according to the present invention will also enable the user to capture the customer language of preference for later use and enhancements such as inclusion in the magnetic stripe on bankcards. If the customer is a non-resident alien, for example, the account will be flagged so that this fact and the language of preference will be displayed on the customer profile for subsequent servicing.

Figure 4A:
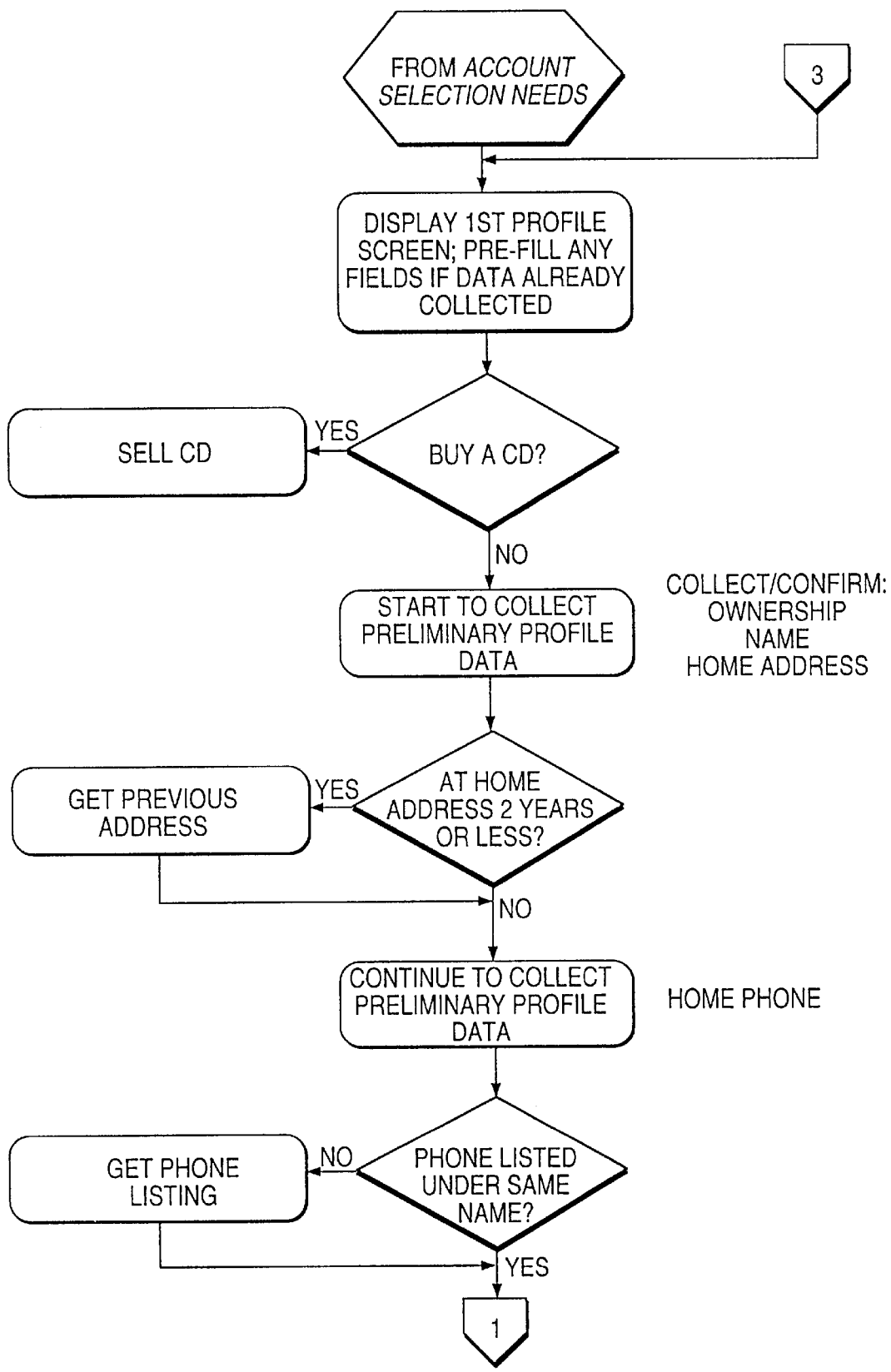
FIGS. 4A–4E are a flow chart showing the preferred embodiment of the process step of building a personal profile in the method illustrated in FIG. 2.
Figure 4B:
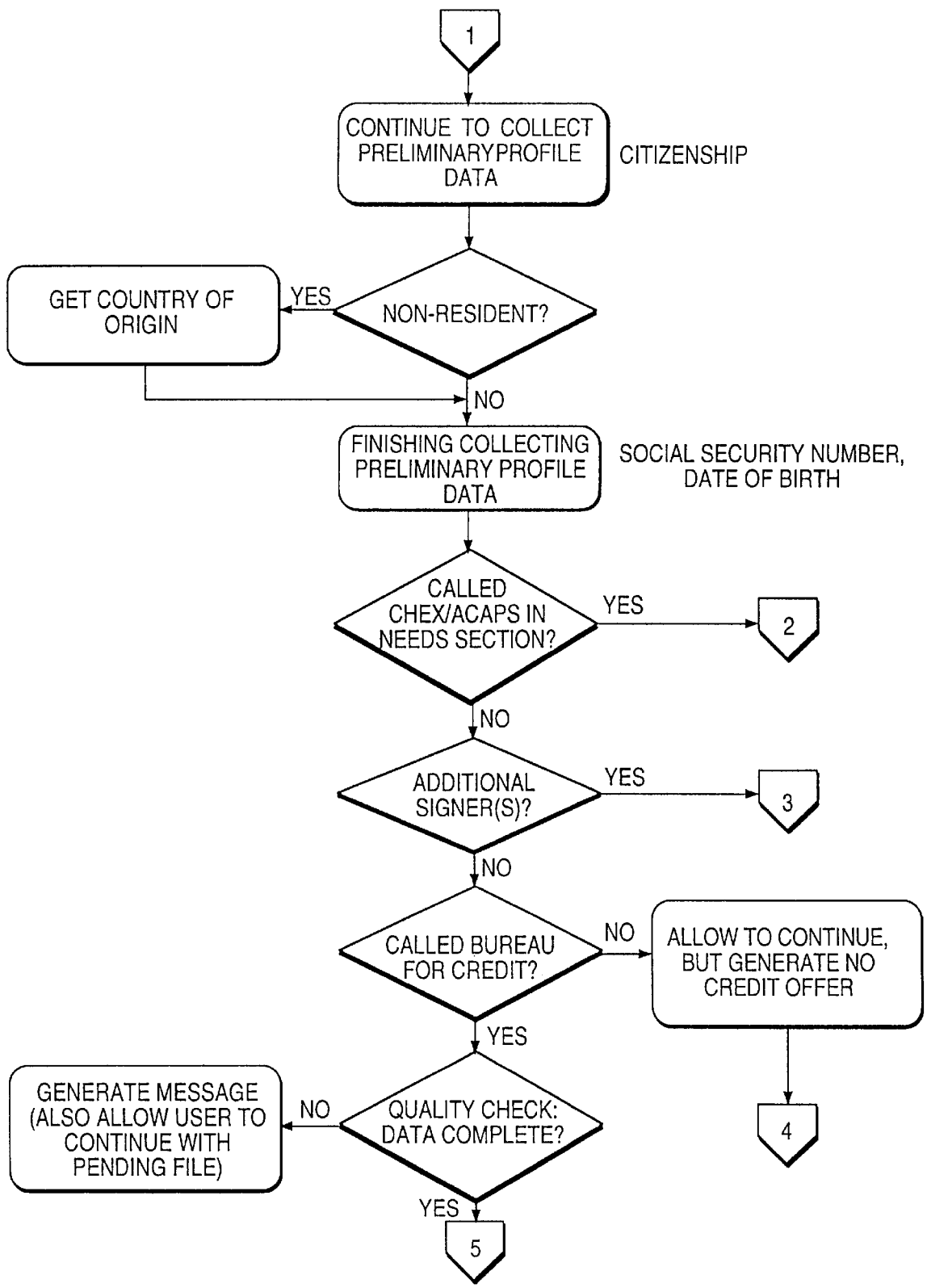

A preferred embodiment of the system and method for performing the personal profile process step is illustrated in the flow chart of FIGS. 4A–4E. Again, this process begins once the account selection/needs assessment step is complete. As shown in FIG. 4A, the process involves collecting identification and information such as ownership of the account, the name of the customer, the home address and phone number, citizenship, social security number and date of birth. The system includes a programmed general purpose computer and/or work station with suitable input means to facilitate this step.

As shown in FIG. 4A, the system generates and displays to the user an initial profile screen showing the fields of data needed with any data that has already been collected in the field. Thus, consistent with the objectives of this invention, the customer need not provide this information again.

After preliminary profile data is collected, the system determines whether a credit check has already been conducted in the previous step. If so, the system moves to the process flow shown in FIG. 4D to continue building the personal profile. If the credit bureau has not already been called the system inquires as to whether there will be additional signers on the account. If so, then the process reverts to the flow shown in FIG. 4A until preliminary profile data is collected for each of the additional signers.

After preliminary profile data is collected for each signer a determination is made as to whether to call the credit bureau. If the credit bureau is not called, the process may continue, but no credit offer may be made. If a determination is made to call the credit bureau then a quality check is made to determine whether the data is complete. If not, an error message is generated and the user is allowed to continue with the pending file. If all data is complete then the process continues to the flow shown on FIG. 4C.

Figure 4C:
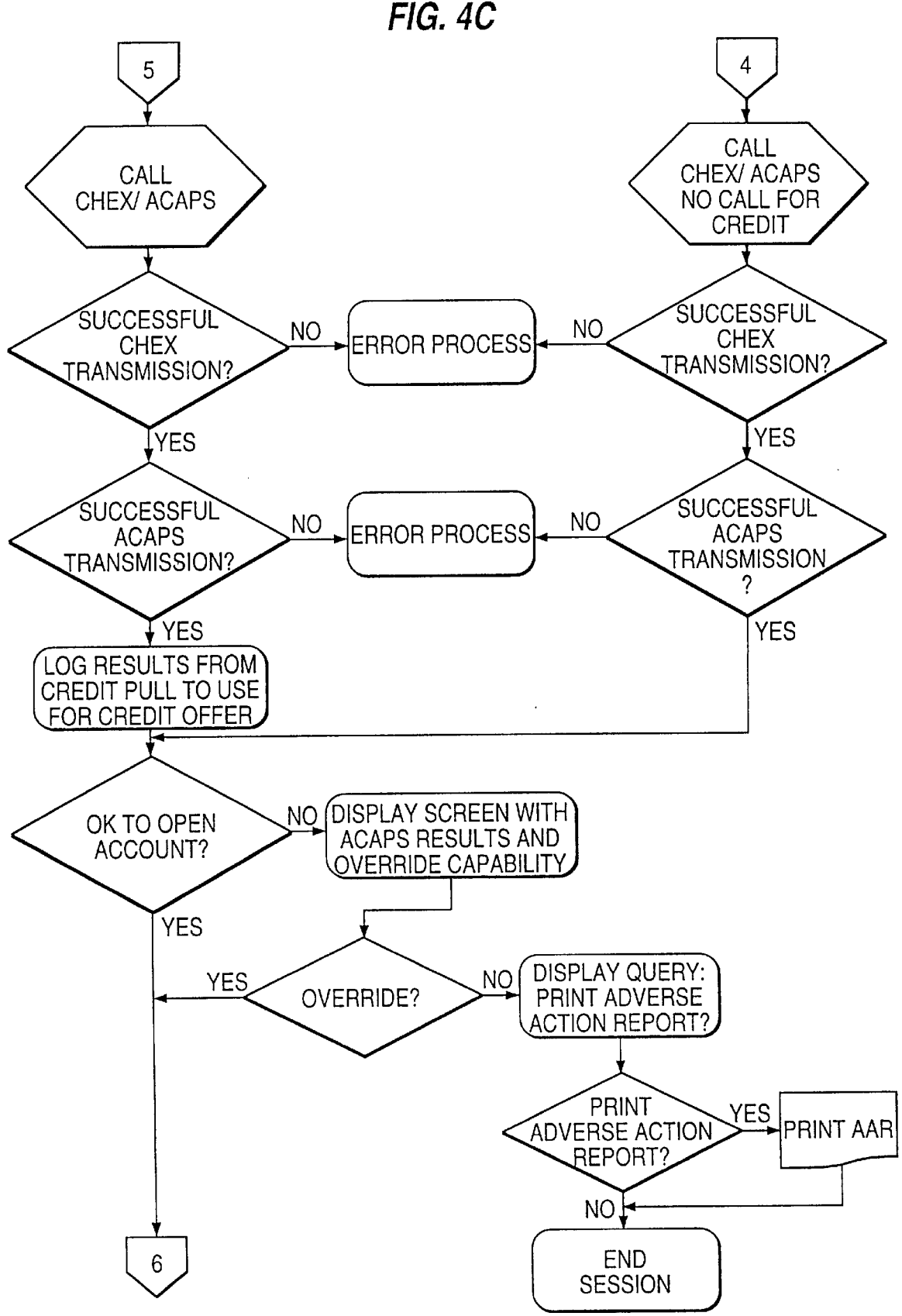

As shown in FIG. 4C, this part of the process flow begins with a call to the credit bureau. A programmed computer and communications equipment such as a modem is used for this purpose. The system checks to see whether transmission of information to the credit bureau. In the preferred embodiment, a two-step credit check is performed as discussed.

Figure 4D:
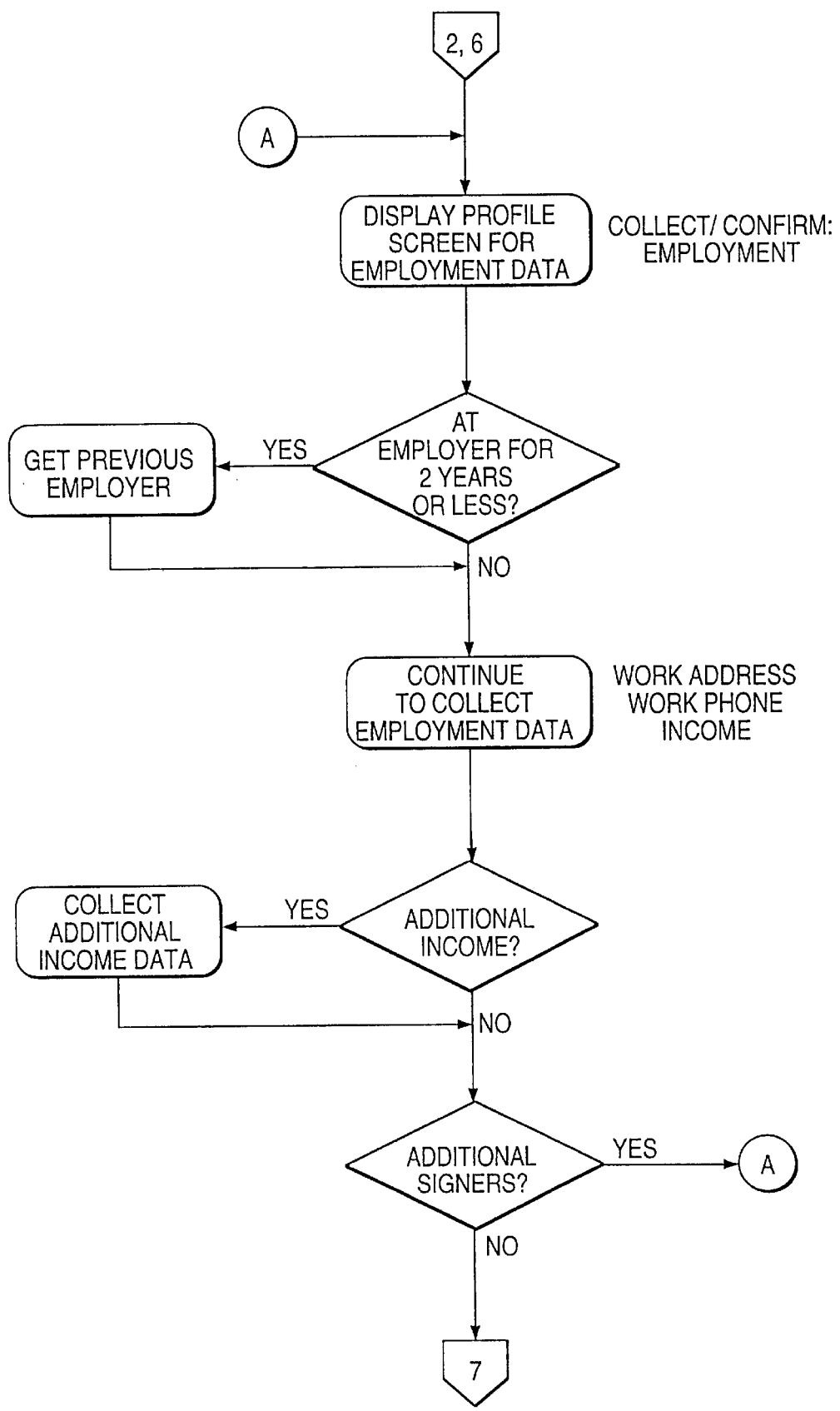

Based on the results of the credit bureau report, a determination is made as to whether the account is approved. If the account is approved, then the process flow continues as shown on FIG. 4D. If a negative determination is made, then a screen is displayed with the results of the credit report giving the user, a bank employee, override capability. If the user chooses to override the refusal then the process continues as shown in FIG. 4D. If, on the other hand, the negative decision is not overridden, the user is given an option to print an adverse action report and the session ends.

Figure 4E:
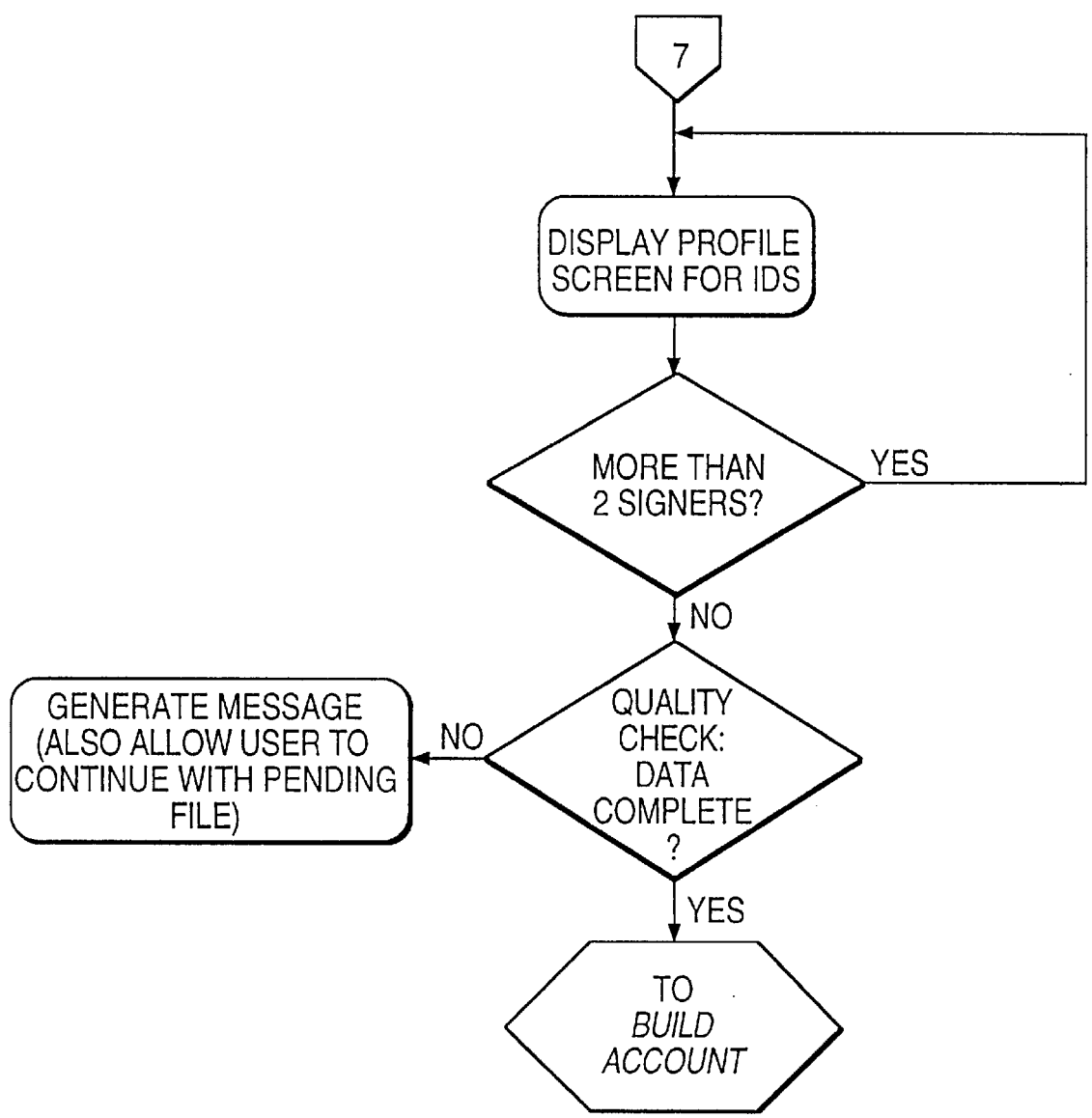

FIG. 4D shows the continuation of the process in the case where the customer's application for account has been approved. As shown therein the process begins by prompting the user to input data concerning employment. If the customer has been with the employer for two years or less information concerning the previous employer is obtained. The system continues by prompting for information concerning work address, work phone and income. If the user wishes to rely on additional sources of income, then that additional income data is collected. The process is repeated for each signer in the account. Once the data has been collected for all signers, the process continues as shown in FIG. 4E.

The process of building a personal profile concludes with a display of the profile screen for user IDs. If there are more than two signers, the process is repeated until all signers are displayed. Finally, a quality check is made to determine that complete data has been received. If complete data has not been received, a message is generated and the user is allowed to continue with the pending file. If complete data has been received, then the process continues to the next step, namely building an account.

ACCOUNT BUILDING PRODUCT SELECTION SYSTEM AND STEP (800) (INCLUDING CREDIT DECISION 800 (810))

Another particularly important aspect of the present invention is the means and process of building the account. In particular, the present invention provides a visual interface that allows the user and customer to watch the account as it is being built. FIGS. 10A–10C show an example of the visual display used in the account building process.

As shown in FIG. 10A, the system displays account information on a computer screen in a bank statement motif, i.e., a facsimile or representation of a bank statement is displayed. The use of the bank statement motif for the account building display is an important part of this invention and is in accord with the underlying objective of presenting a consistent interface to customers. The display shows what the customers bank statement looks like before the account is built. Core components such as checking, savings, IMMA, CD's, retirement, brokerage, line of credit and credit card are included in the example. Naturally, the displayed statement reflects zero balances for each account. When other components are added to the account as discussed below, they also appear on the displayed statement.

To build the account, the user selects (by input device) one of the listed components. If, for example, the "checking" component is selected, the system displays a checking component build screen of the type shown in FIG. 10B. The screen allows the user to select a particular component and enter the amount to be credited to the selected component. In the example shown, the user has selected the regular checking component. The system also prompts the user to enter an amount to be allocated to the checking component that has been selected.

If, for example, the customer chooses to allocate $5,000 to checking, the user enters this amount and returns to the displayed statement screen.

As shown in FIG. 10C, the displayed statement is then updated to reflect a checking balance of $5,000.

In this way, the customer and user can build the integrated account to the customer's specifications and watch the account being built in a step-by-step fashion. In addition, the information is presented in a bank statement format that is consistent with all other customer access points for interfacing with the bank.

Once the components of the bank account the customer intends to fund during the session have been determined, the user will select functions on the account opening screen. To begin with, the user will select any products that will be opened in the session. At this point, the system will automatically assign the component number for the liability components in the consumer bank account. The automatically assigned number may be overridden if necessary.

Next, the user will complete any necessary details such as term, initial deposit, and interest rates. Then, the user will enter the account title and any other account specific data needed (for example, number of signers required if other than the default of one). A preferred embodiment of the system for building the account is shown in FIGS. 5A–5M. The system includes a programmed general purpose computer to facilitate those steps.

Figure 5A:
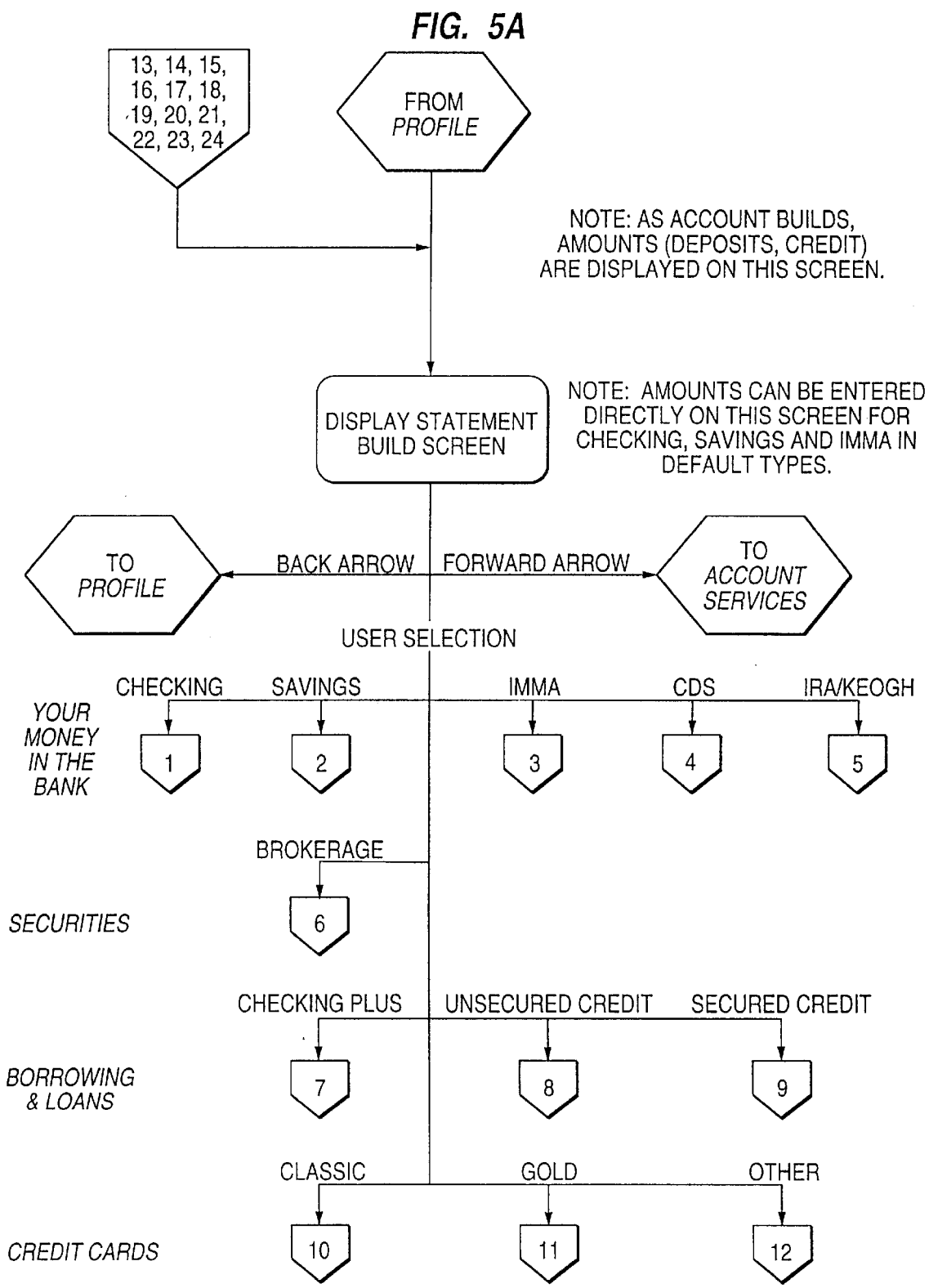

As shown in FIG. 5A, the system begins the account building process by displaying a statement build screen. Preferably, this display provides the user with the opportunity to select each of the components of the integrated account. In the embodiment shown, the user may select between twelve components. As components are selected in the account and the account builds, the amounts (deposits, credit) are displayed on the statement build screen of the type shown in FIGS. 10A and 10G, for example.

Typically, the amount for each component and relevant information concerning that component is provided by selecting the component and following the process for building that component. In the preferred embodiment shown in FIG. 5A, however, amounts can be entered directly on the statement building screen for checking, savings and ensured money market accounts if desired.

As shown in FIG. 5A, the system consistently provides the user with the option to return to the previous step, i.e., building a personal profile or move forward to the next step i.e., account services. Absent one of these selections, the portion of the system shown in FIG. 5A operates in a loop whereby the customer selects a particular component and proceeds through the prescribed process for that component as shown in FIGS. 5B–5M and then returns to the statement building screen which is progressively updated to include the components as they are built.

Figure 5B:
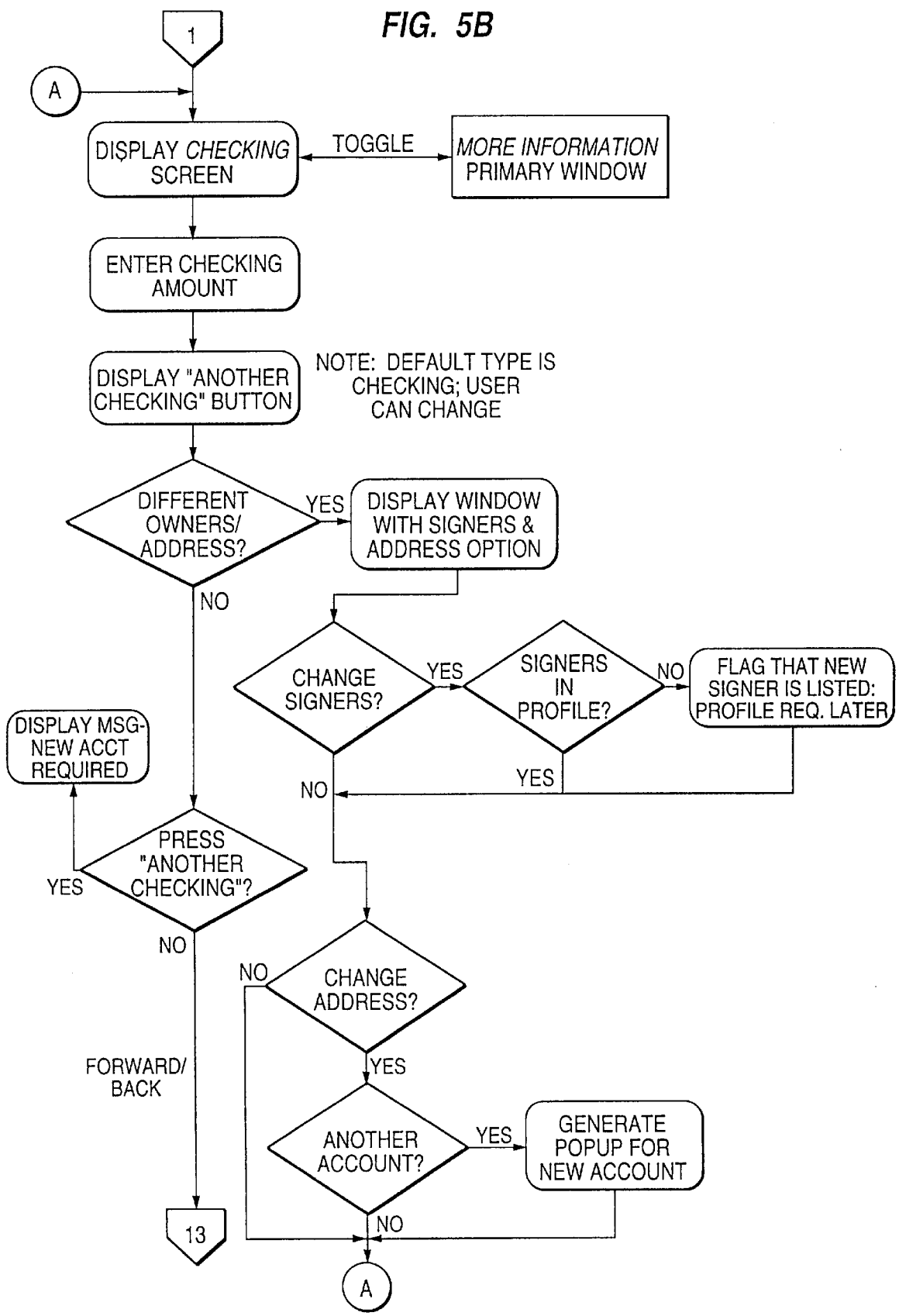

If the user selects a checking component the system follows the path shown in FIG. 5B. Specifically, the system displays a checking component screen or screens. The user then enters the amount to be allocated to checking. The system then inquires as to whether there will be different owners or different addresses for the checking component. If so, the system then enters a subroutine to obtain the additional information concerning different signers and/or changes in address. Again, an important aspect of the present invention is that the user is initially presented with a display showing all salient information that has been collected thus far. Thus, even in the subroutine, it is only necessary for the customer and user to provide information that has not previously been obtained. Once the checking component has been built to the customer's specification concerning owners and addresses, the system provides the possibility of building another checking component. If a customer elects to build an additional checking component, a message is displayed and the routine is followed again. If, on the other hand, the customer elects not to build another checking component, then the system returns to the statement building screen of FIG. 5A and the user is able to select another component.

Figure 5C:
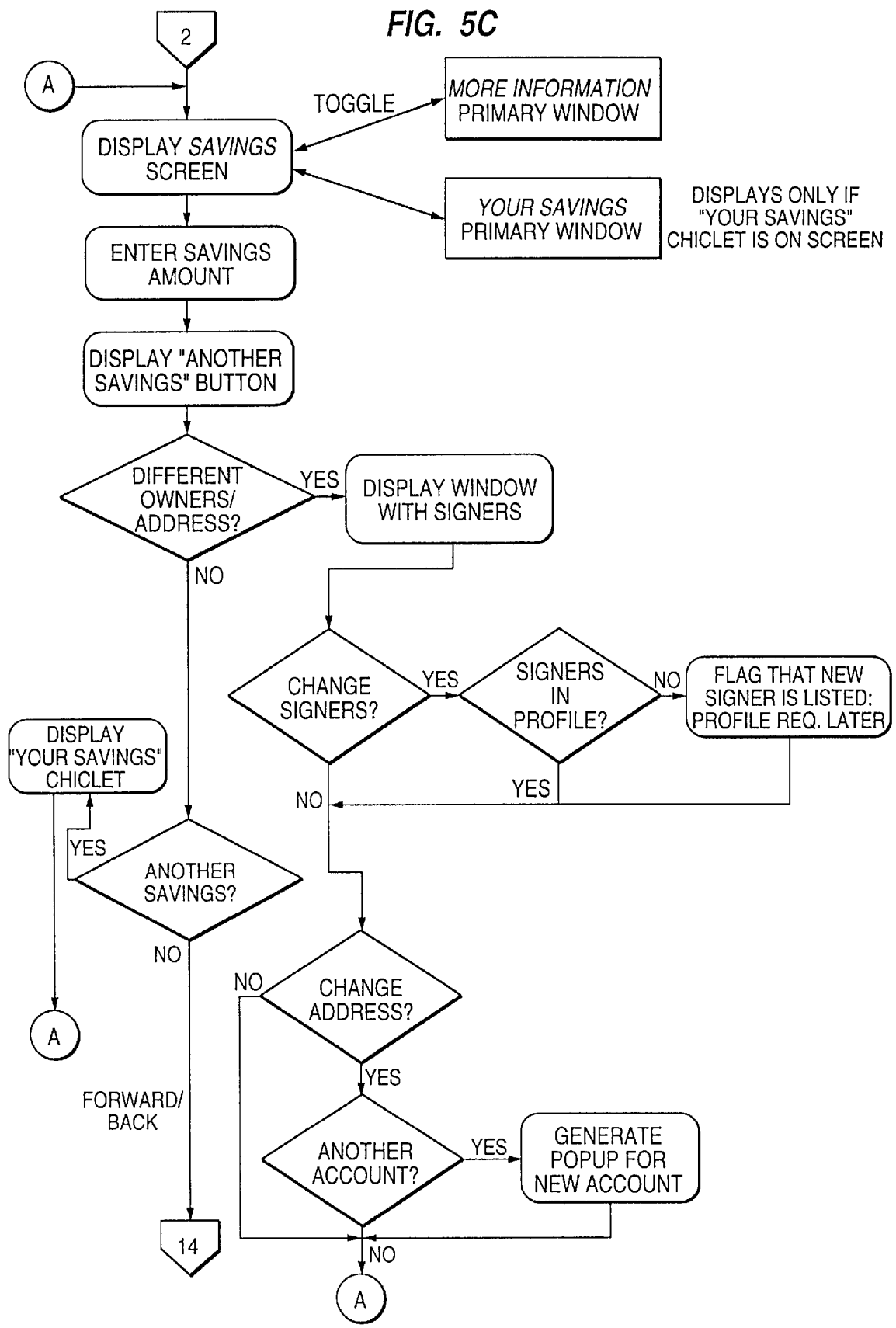

If the user selects the savings component from the statement building screen, the system follows the path shown in FIG. 5C. The process shown in FIG. 5C for building a savings component is essentially the same as the process for building a checking component. In particular, as shown in FIG. 5C, the user is prompted to enter an amount for a savings component and then allowed to provide any additional information required regarding different owners or addresses. This is, again, accomplished through the use of a subroutine. And finally the user is allowed to choose to build another savings component. When the savings component has been built to the customer's satisfaction, the system returns to the statement building screen shown in FIG. 5A.

Figure 5D:
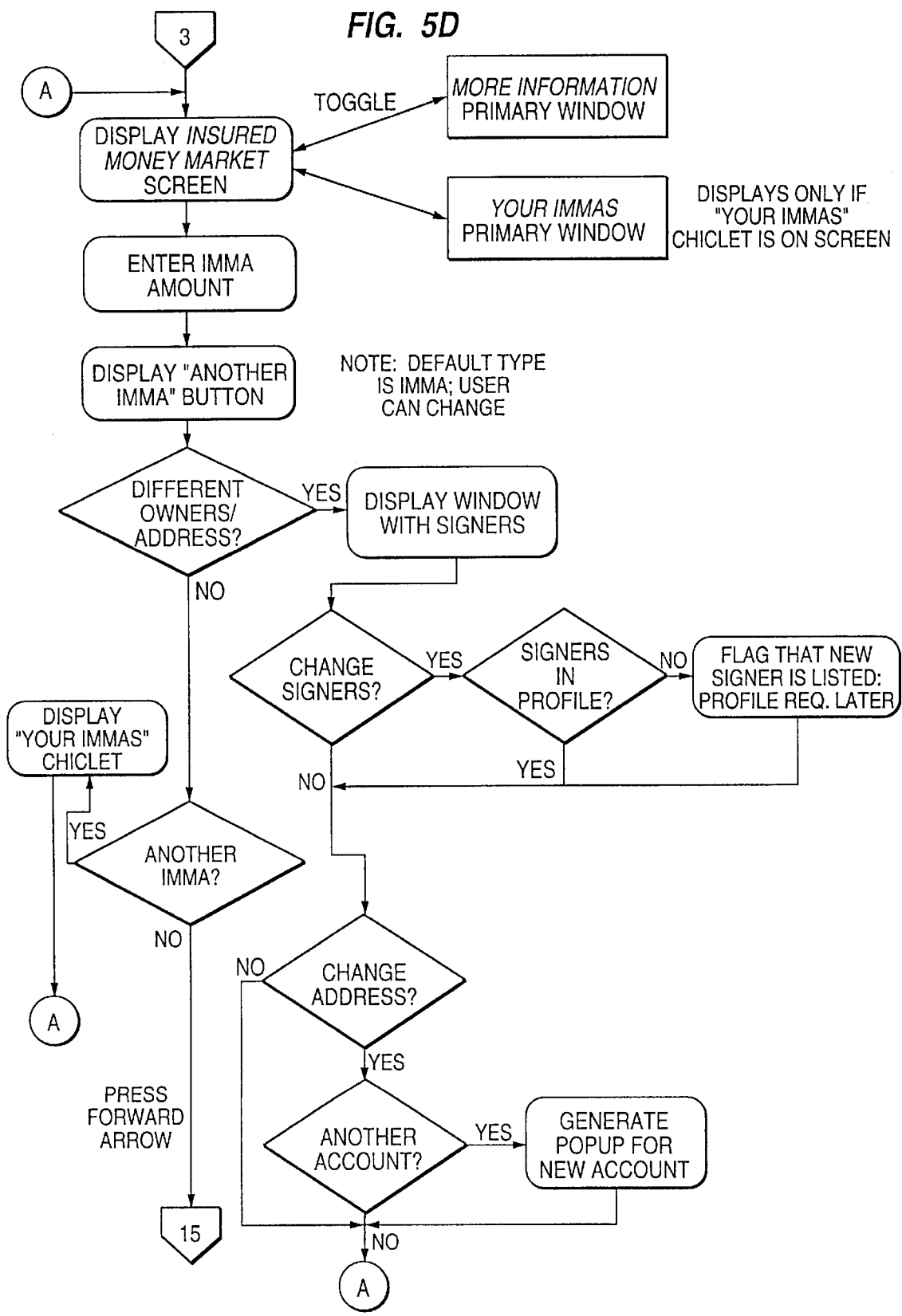

When the user selects the insured money market account (IMMA) component, the process follows the flow shown in FIG. 5D. The process is again similar to that followed for building, checking and savings components. The user enters an IMMA amount and is then given the opportunity to update information concerning owners and addresses. Finally, the user is given the opportunity to build another IMMA account and, if that is desired, the process is repeated. Once all IMMA components have been built, the process returns to the statement building screen of FIG. 5A.

Figure 5E:
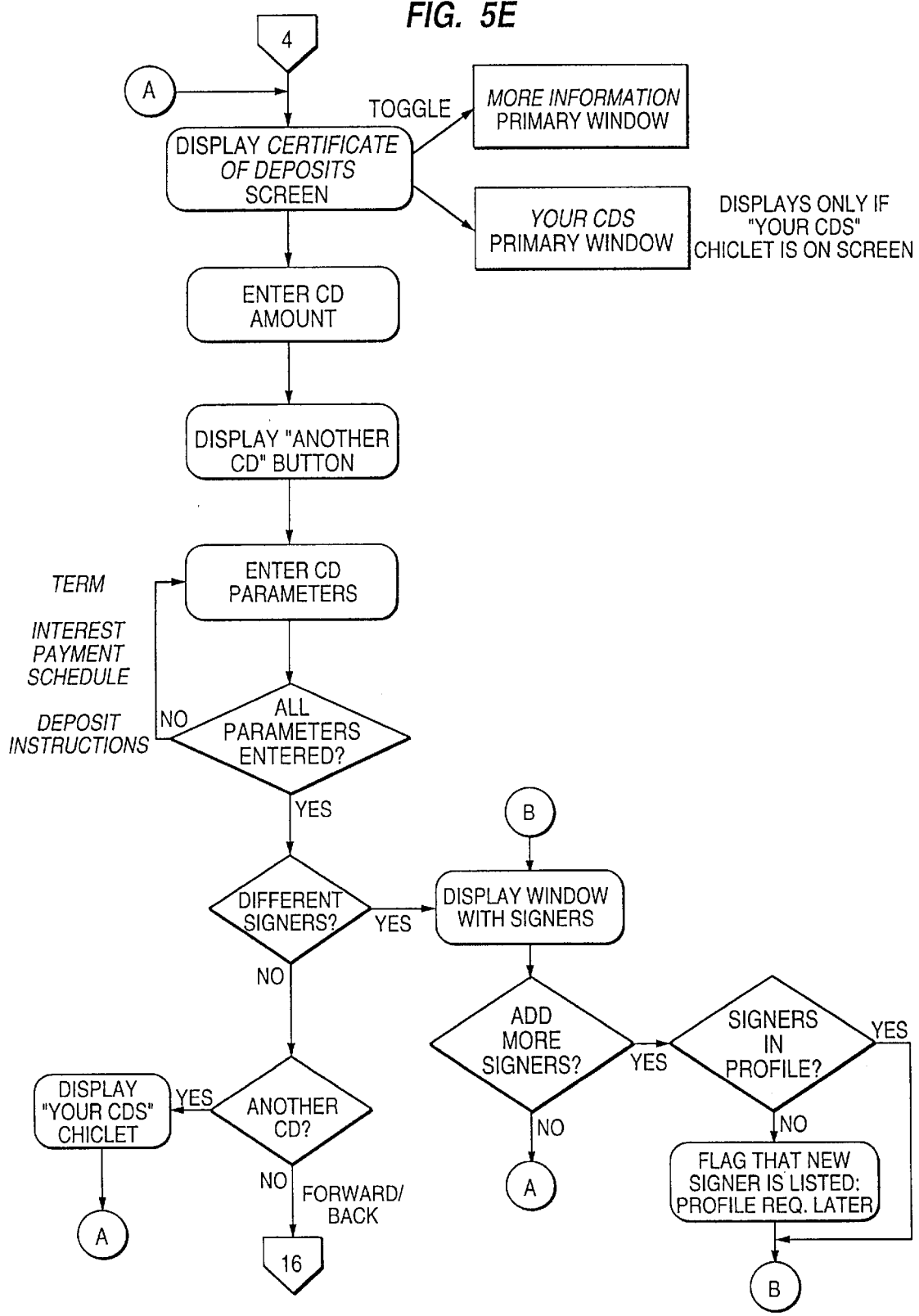

If the user selects a certificate of deposit component, the system follows the flow shown in FIG. 5E. Specifically, a certificate of deposit screen is displayed and the user then enters a certificate of deposit amount. The system then prompts the user to enter the certificate of deposit parameters including term, interest payment schedule and deposit instructions. The process is repeated until all parameters have been entered. Once all the parameters have been entered the system allows the user to decide upon the authorized signer for this component. This subroutine begins with a display of the authorized signers based on previously collected data. The user may then add additional signers. If the additional signers to be added have already been profiled, no further information is required. On the other hand, if a new signer is listed, the system flags that a new signer is listed and a profile will be required later. Once the signers are consistent with the customer's intentions, the system allows the user to build another CD component. If the user elects to do so, the process is repeated. If, on the other hand, the user elects not to build another CD component, the system returns to the statement building screen of FIG. 5A.

Figure 5F:
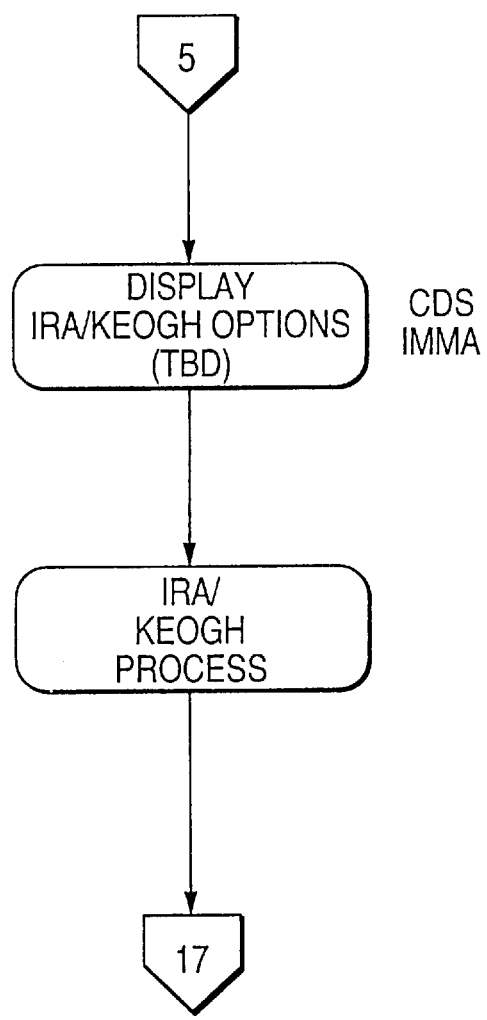

If the user selects the IRA/401K component, the system follows the flow shown in FIG. 5F. The flow shown in FIG. 5F is a very high level consisting only of a display of available options followed by execution of the process for building those options. The process for building the options could, according to the present invention, be constructed along the lines of the processes shown in FIGS. 5B–5E for building checking, savings, IMMA and CD components. Once the IRA/401K component is built to the customer and user's satisfaction, then the system returns to the statement building screen.

Figure 5G:
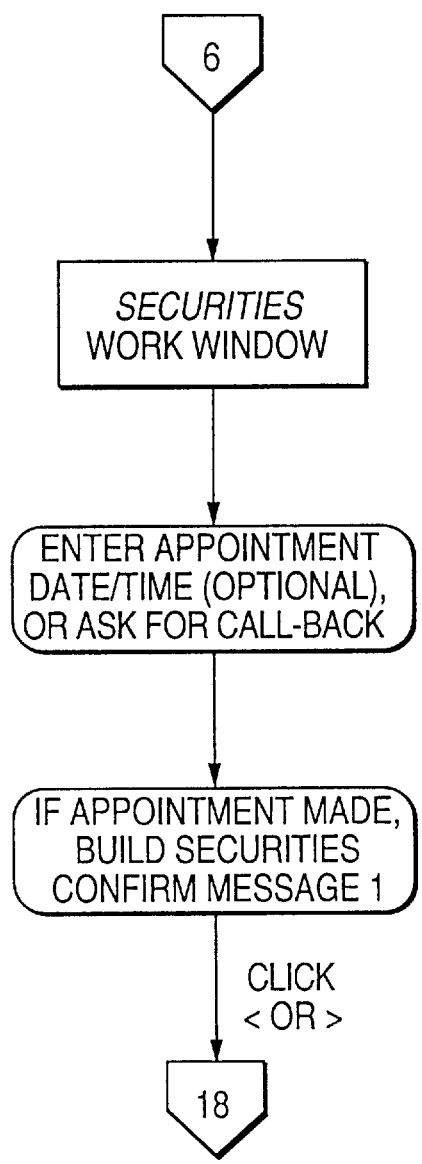

If the user selects the securities or brokerage component, the system follows the flow shown in FIG. 5G. Specifically, the system displays a securities work window that allows the user to enter an appointment date and time or ask for a call back. The reason for this is that typically information relating to building the securities component must be handled by a licensed bank employee. If an appointment is made, then the system builds a securities confirm message and the system returns to the statement building screen.

The system also includes means for limiting access to certain authorized or licensed users to ensure compliance with applicable regulations. For example, information obtained in the "Brokerage" section will be "investment information" and any other information which may be specific to Brokerage. According to regulations, "investment information" can only be discussed with a customer by a licensed individual. Therefore, access to this screen will be limited to licensed users. The means for limiting access is preferably a programmed general purpose component.

Figure 5H:
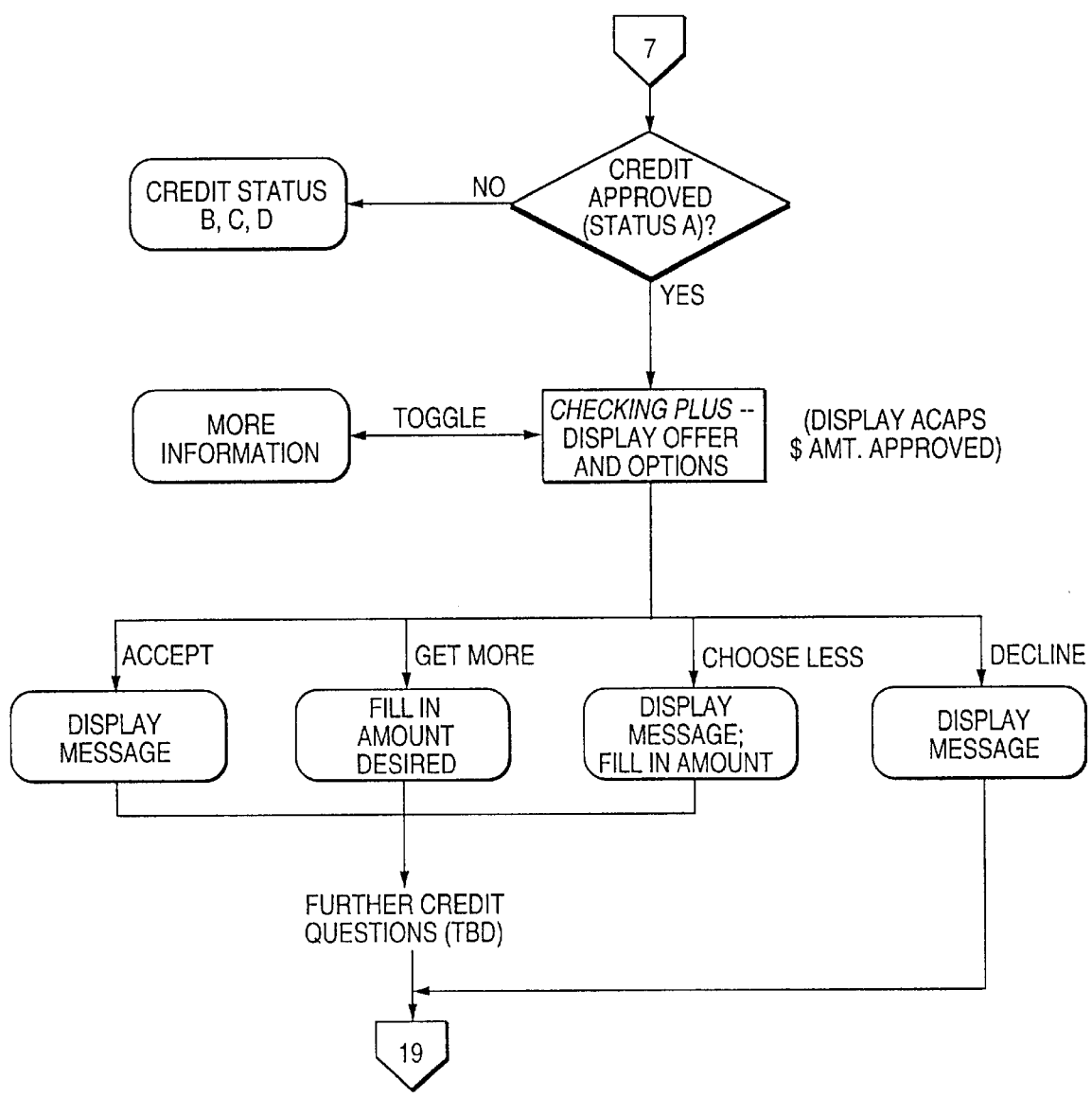
Figure 51:
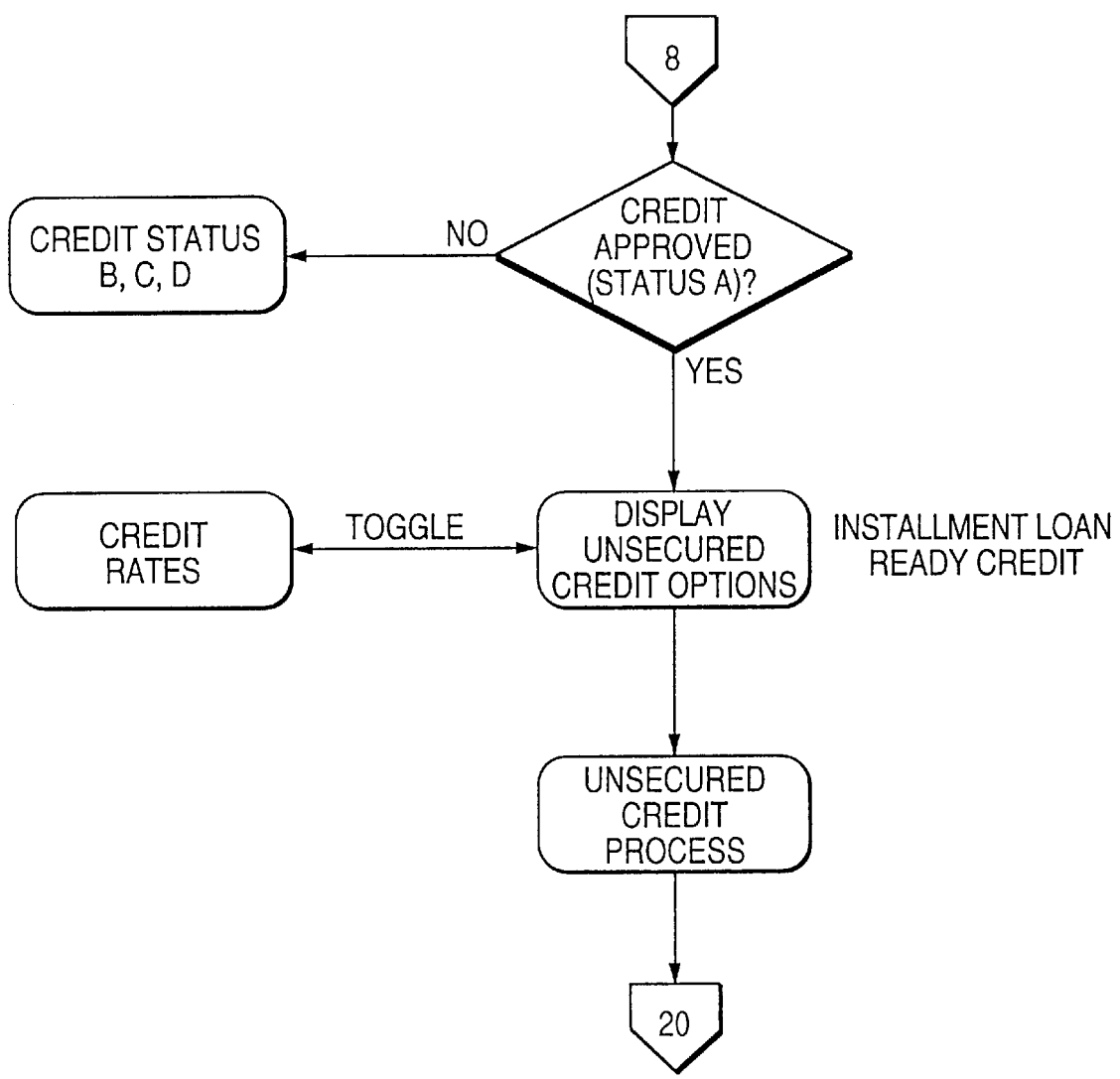

If the user selects a borrowing and loan component such as checking plus, the system follows the flow shown in FIG. 5H. Specifically, an initial determination is made as to whether credit has been approved. If credit has not been approved, then the user is not allowed to build this component of the account. If, on the other hand, credit has been approved, the system displays a checking plus offer and option screen that includes information concerning the amount of credit available. The customer, via the user, may then accept the amount of credit offered, request additional credit (in which case the system must enter a separate procedure not shown) to seek authorization for the additional amount, choose to accept less credit than is offered or decline credit. The system then returns to the statement building screen of FIG. 5A.

If the user elects to build an unsecured credit component, the system follows the flow shown in FIG. 5I. Specifically, an initial determination is made as to whether credit has been approved. If not, then the user is not permitted to build the unsecured credit component. If credit has been approved, then the system will display the unsecured credit options and credit rates. The system will then perform the unsecured credit component building process. Once the process is completed the system will return to the statement building screen.

Figure 5J:
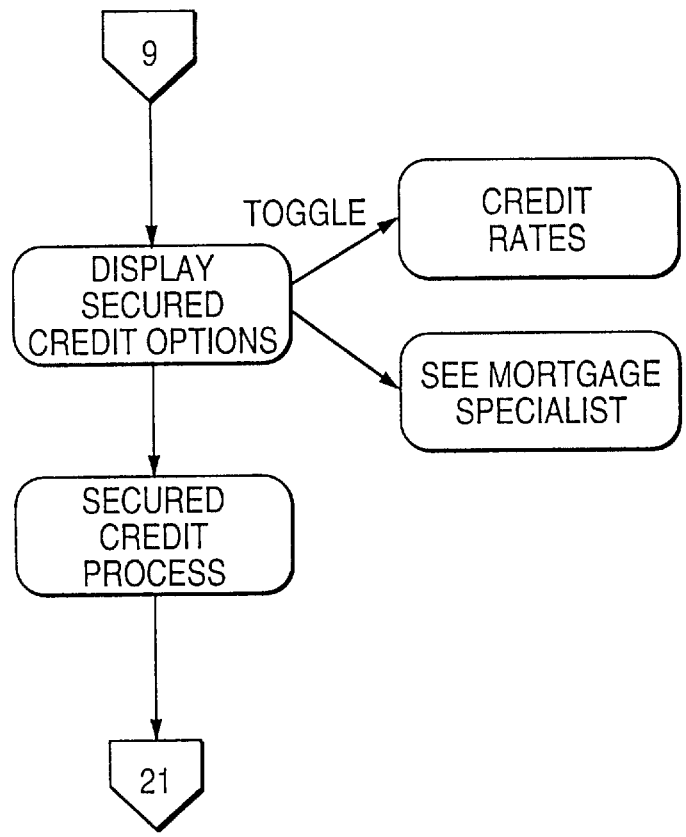

If the user elects to build a secured credit component, the system will follow the flow shown in FIG. 5J. Specifically, the system will display the various security credit options including equity source, fixed rate home equity loans, mortgage, preferred line, preferred loan, secured loan, securities based lending and student loan options. The system also can display credit rates and other information. Once a selection is made, the system performs the secured credit component building process until all the desired and available options have been built then the system returns to the statement building screen of FIG. 5A.

For some products, particularly secured credit, there will be additional information that will be required to complete the application. If the credit bureau pull did not indicate that the customer was "credit-qualified," this screen would not be displayed unless the customer made a specific request for a credit product. Included on this screen is items such as property information, housing expenses, Government Monitoring/HMDA information, etc. Any information that was captured as part of the BPA should flow forward into any of the appropriate fields in these screens.

Before the credit information is transmitted to a credit bureau for a credit decision, the system will need to perform a quality check on the data that has been entered to ensure that all required data has been entered. If any information is missing, the system should request the appropriate information. If the information is available, the user will be given the opportunity to enter it; if not available, the ability to place the application in "pending" will be provided.

According to the present invention, the credit decision screens will be accessible within the account opening flow to eliminate the need to toggle out of the account opening-session and into another system.

The user is able to complete verifications and any credit actions that are necessary on these series of screens within the account opening process. Verifications completed on one loan product should flow forward to any other loan products in the session. Various factors, such as line size and product type, determine the verifications to be performed; the verifications performed is updated on all products for which the customer has applied.

Figure 5K:
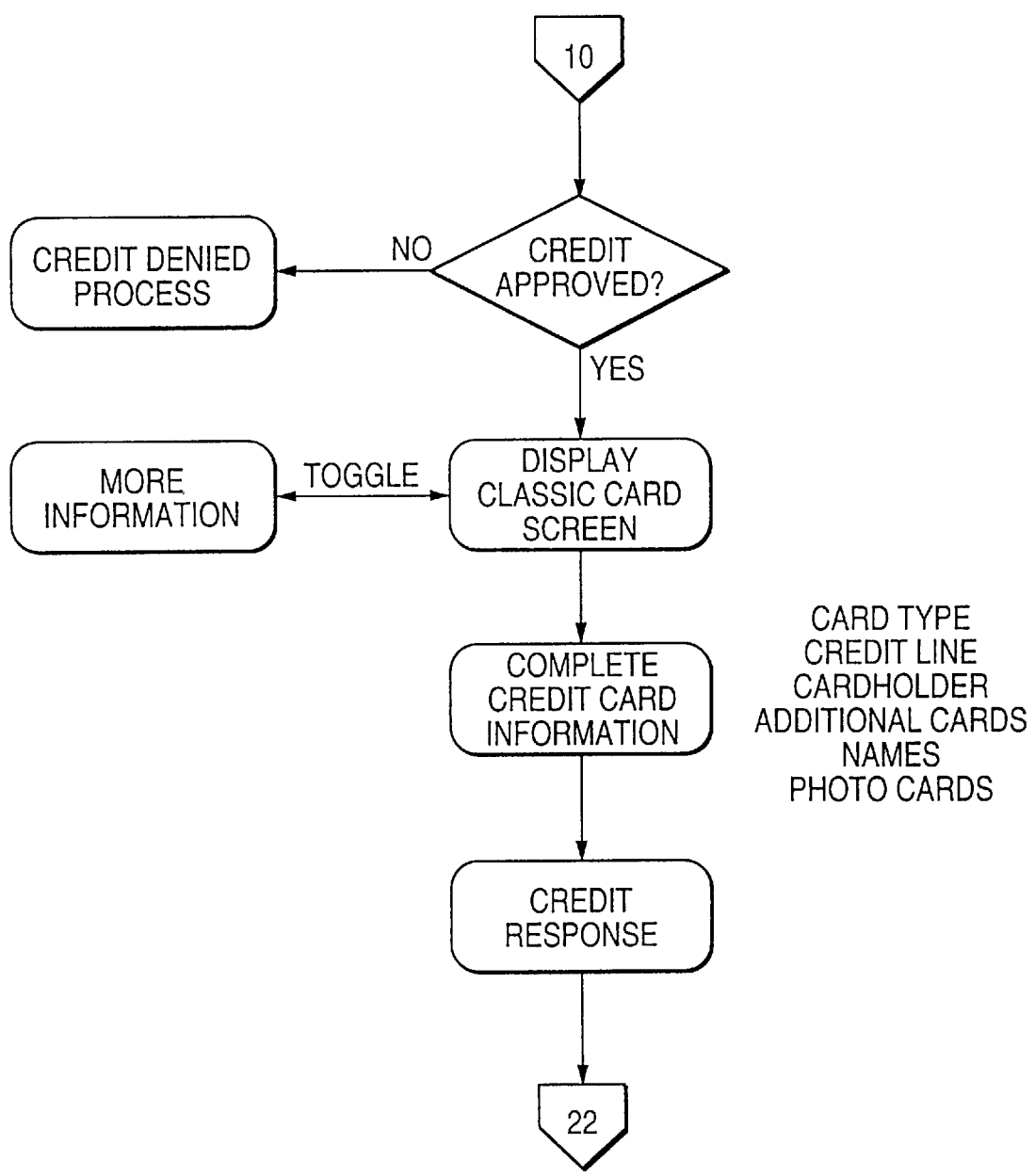
Figure 5L:
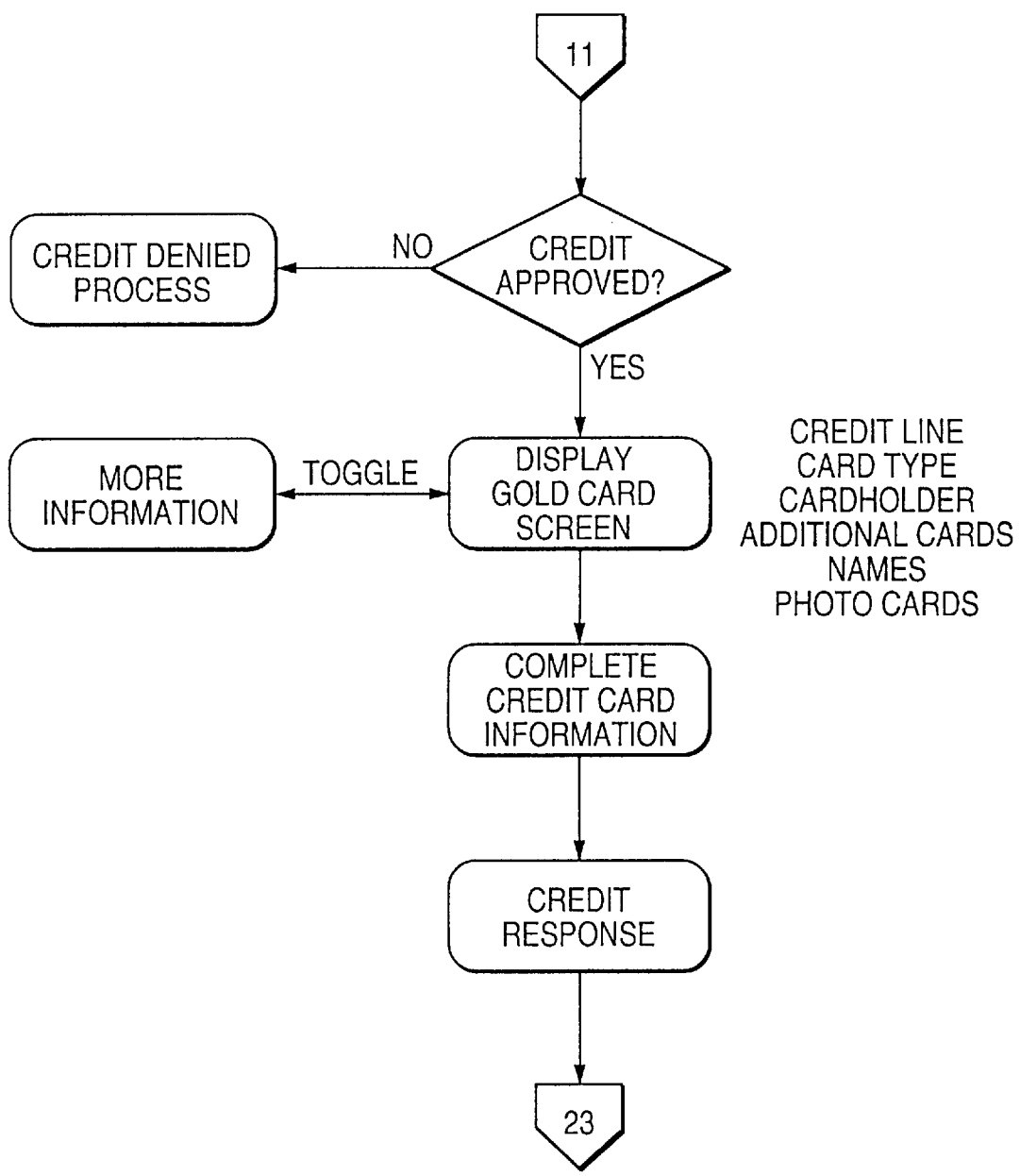
Figure 5M:
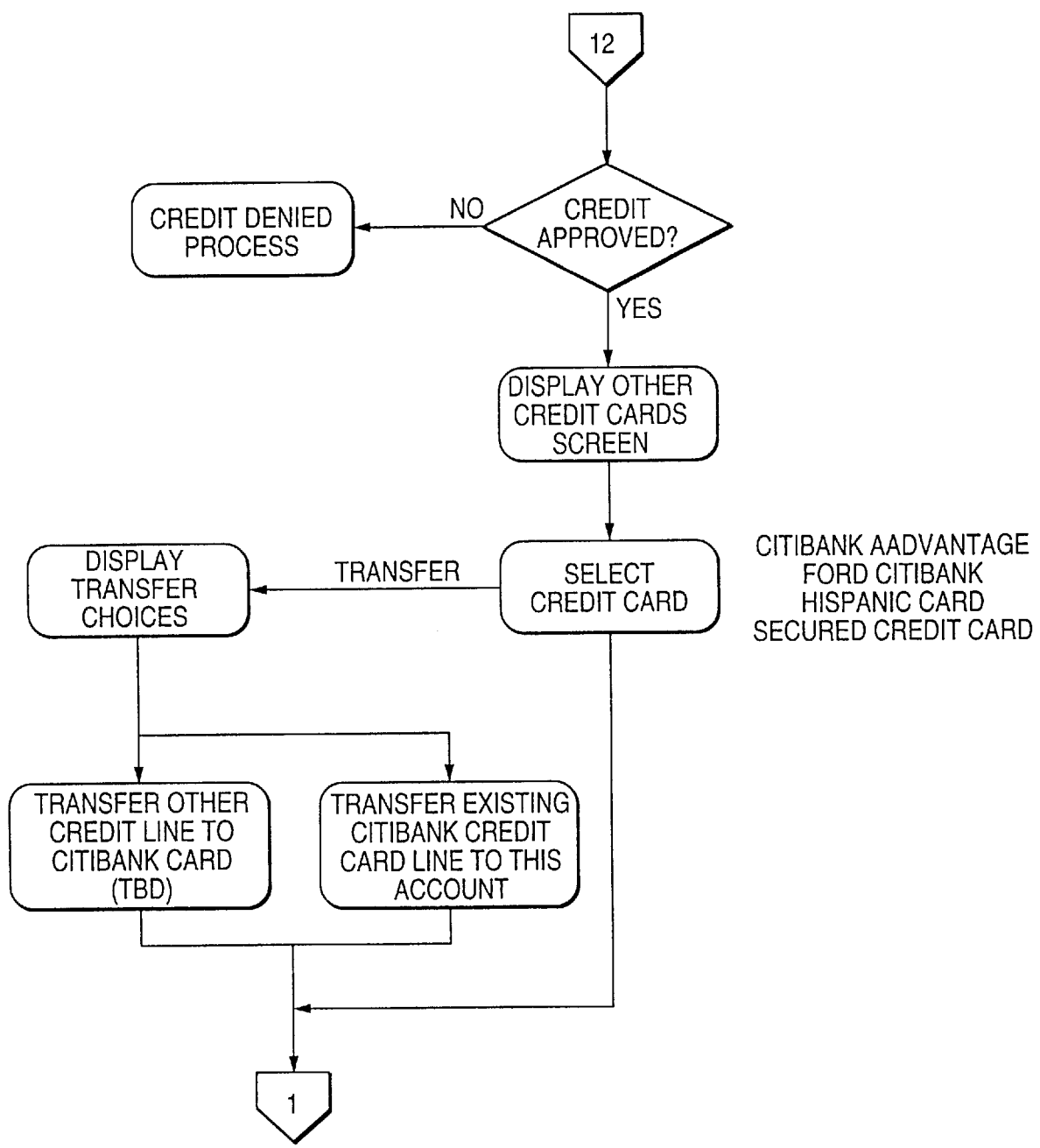

If the user elects one of the credit card options the system follows the flow shown in FIGS. 5K–5M. The system flow shown in FIGS. 5K and 5L are identical and the differences would depend on the differences between the classic credit card and the gold credit card offered by the particular bank. The basic process involved is an initial determination of whether credit has been approved followed by an informational screen concerning the particular card and then user input of information required for the card including card type, credit line, cardholder, additional cards, names and photocards. A determination of the credit line is then made and the system returns to the statement building screen.

If the user selects another card that is offered by the bank, a similar flow is followed except that when the customer selects a particular type of credit card the customer and user are given the option to either transfer an existing bank credit card line to this account or, conversely, to transfer another credit line to a bank credit card. After this process is complete the system returns to the statement building screen of FIG. 5A.

This part of the process will be used to ensure the customer is familiar with the various services available. Again, a programmed general purpose computer is believed to be the most suitable means for performing this step.

These screens will present another opportunity to review how the customer can use the bank to manage their money and realize the benefits of deepening their relationship with Consumer bank. Screens will need to be a combination of data capture and product/service features to be reviewed with the customer, if appropriate.

A preferred embodiment of a system for performing the account services step is shown in FIGS. 6A–6G.

Figure 6A:
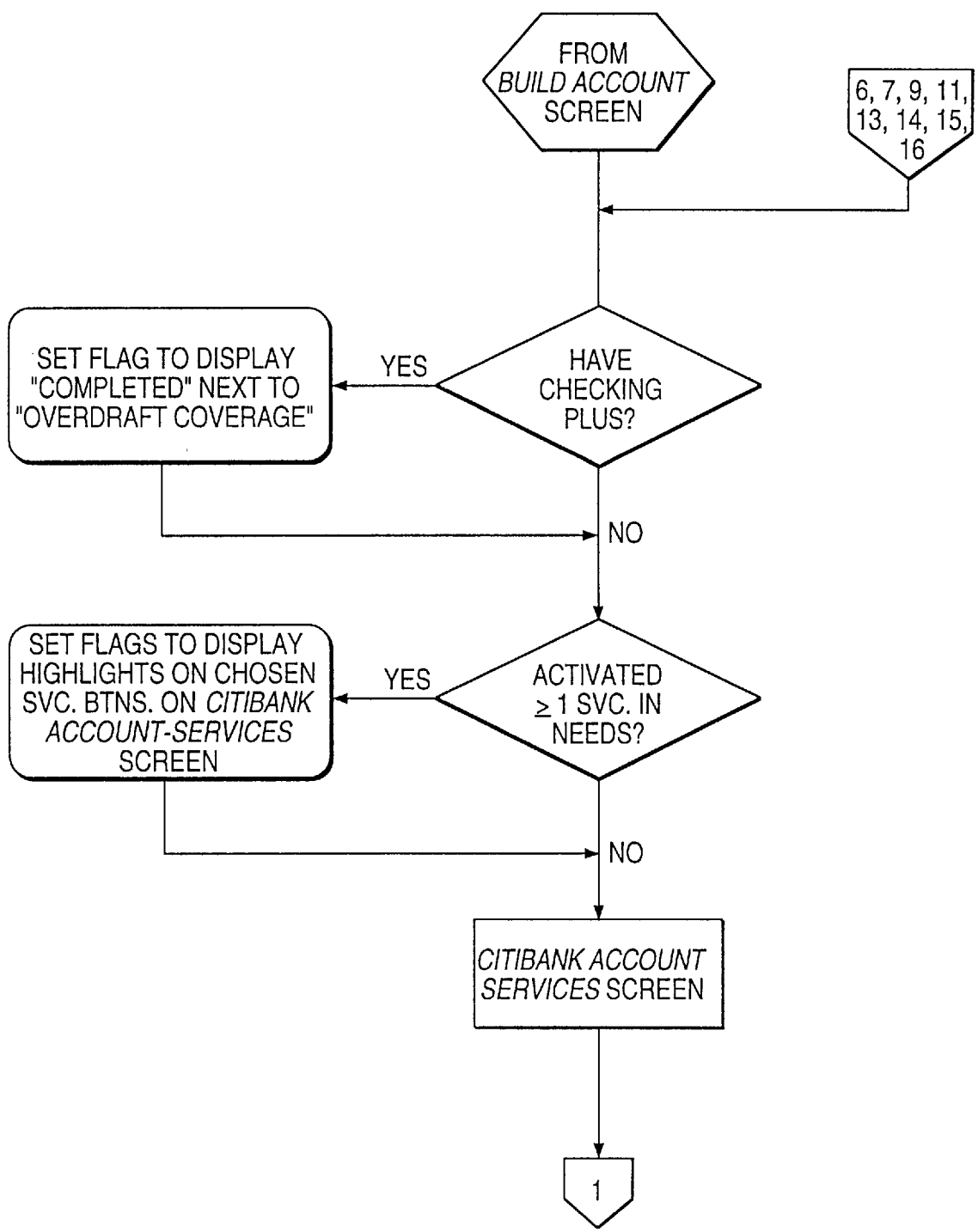

As shown in FIG. 6A, the system begins by reviewing the data previously collected to see whether the customer has been enabled for checking plus service, in which case, i.e., overdraft protection. If so, a flag is set and the system proceeds. If not, the system proceeds without setting the flag. Next, the system determines whether or not more than one service has been activated during the account selection needs process. If so, the flags are set to display highlights on the chosen service buttons on the Citibank account services screen and the accounts services screen is displayed. The system then proceeds to the flow shown on FIG. 6B. Whereas the user may elect to set up a service or get information concerning the service. If the user chooses not to set up a service or get information concerning a service, the user is provided the opportunity to note the customer's interest in one or more additional services. If the user indicates interest in one or more additional services, the system notes the need to follow up on that interest and proceeds to printing the enrollment form.

If the user has indicated a desire to set up a service or get information, then the system proceeds to the flow for that particular service. Naturally, banks may provide various services. In the embodiment shown in FIG. 6B, however, the system can provide information or set up automatic transfers, bill payment service, direct deposit, immediate access to deposited funds, automatic dividends deposit, secured lending, overdraft coverage, automatic payments and electronic payments.

If the user chooses to set up automatic transfers, the system follows the process shown in FIG. 6C and D. In this procedure, the system allows the user to set up automatic transfers and also reoccurring transfers using the procedure shown in FIG. 6D.

Figure 6B:
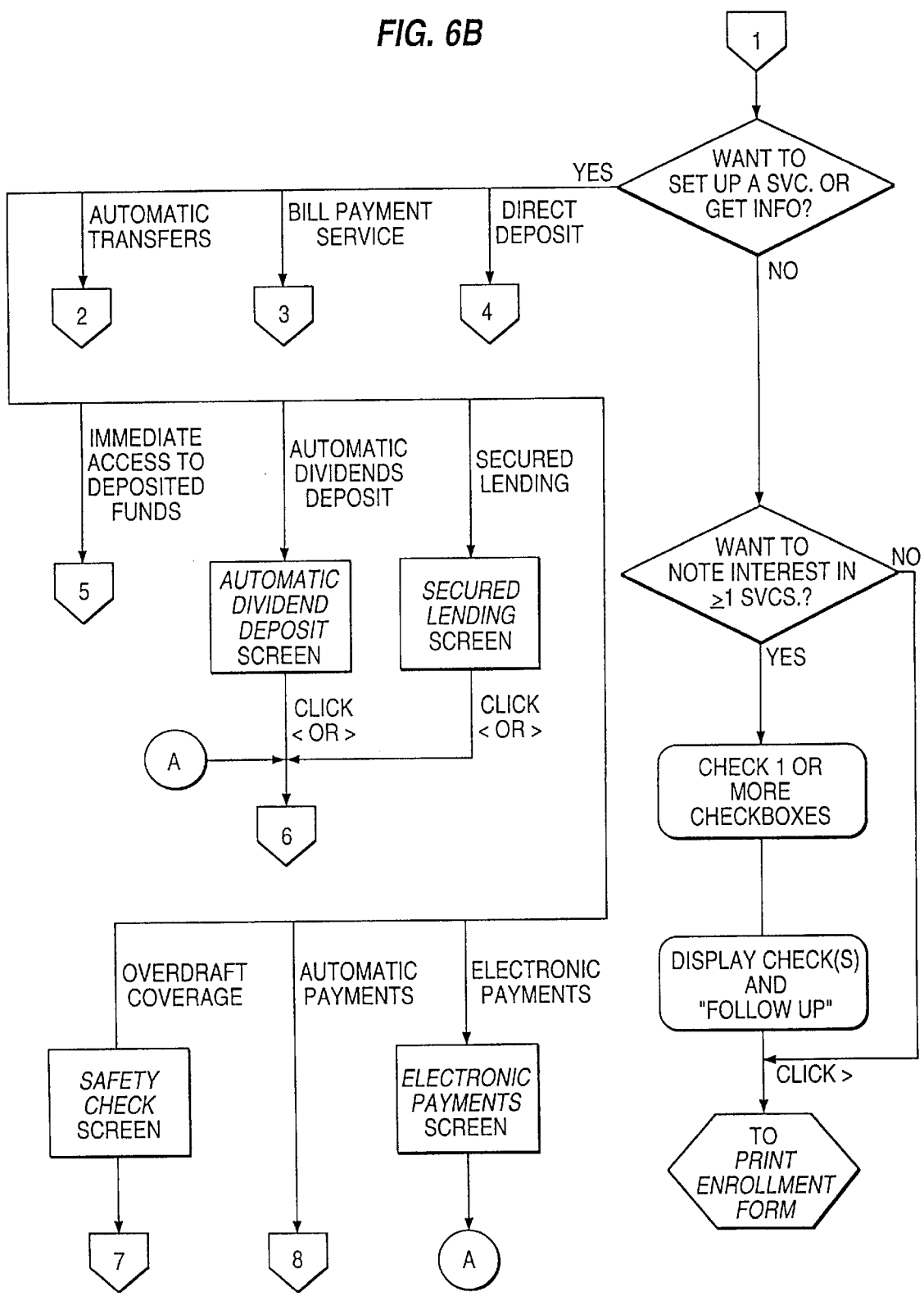
Figure 6D:
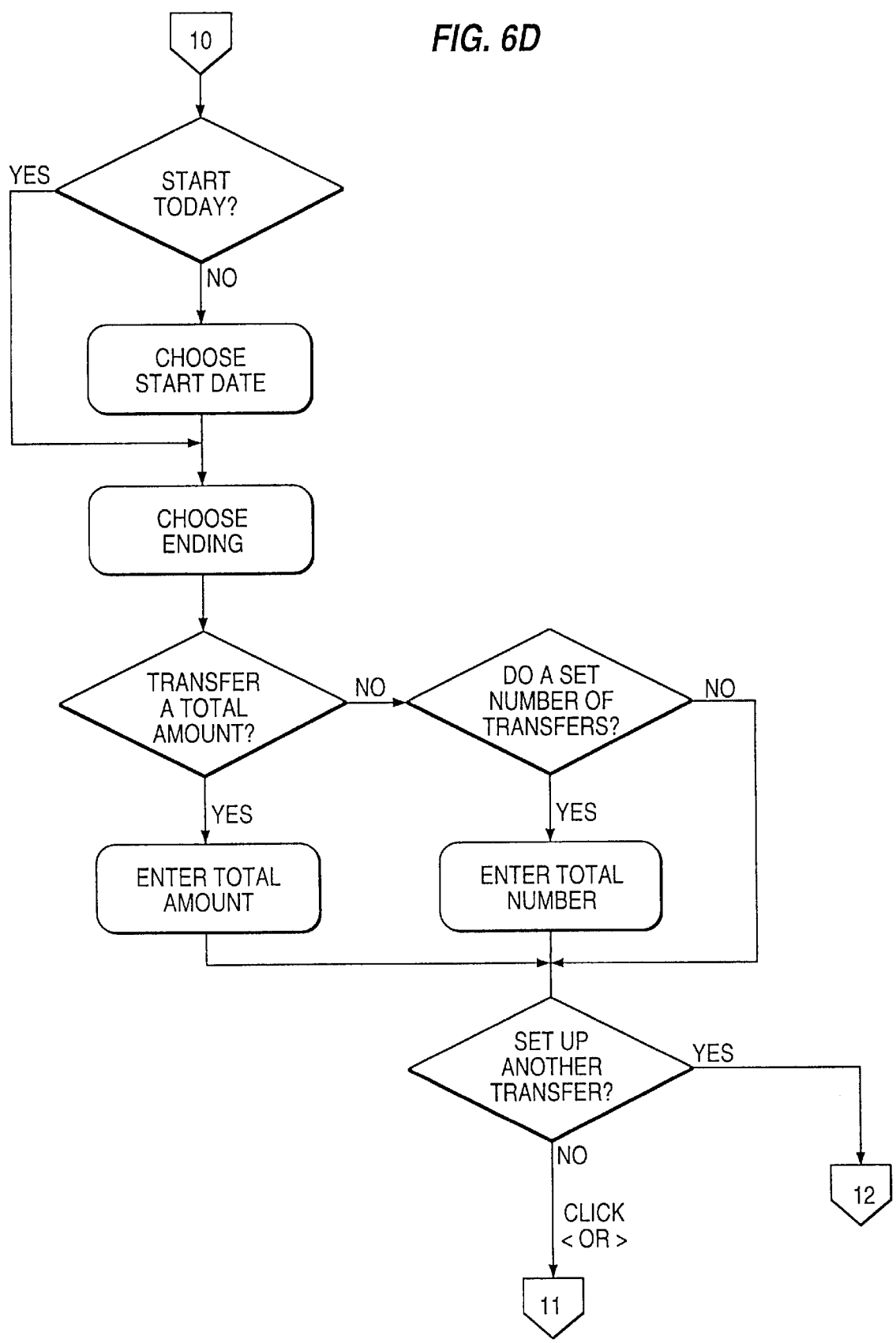
Figure 6E:
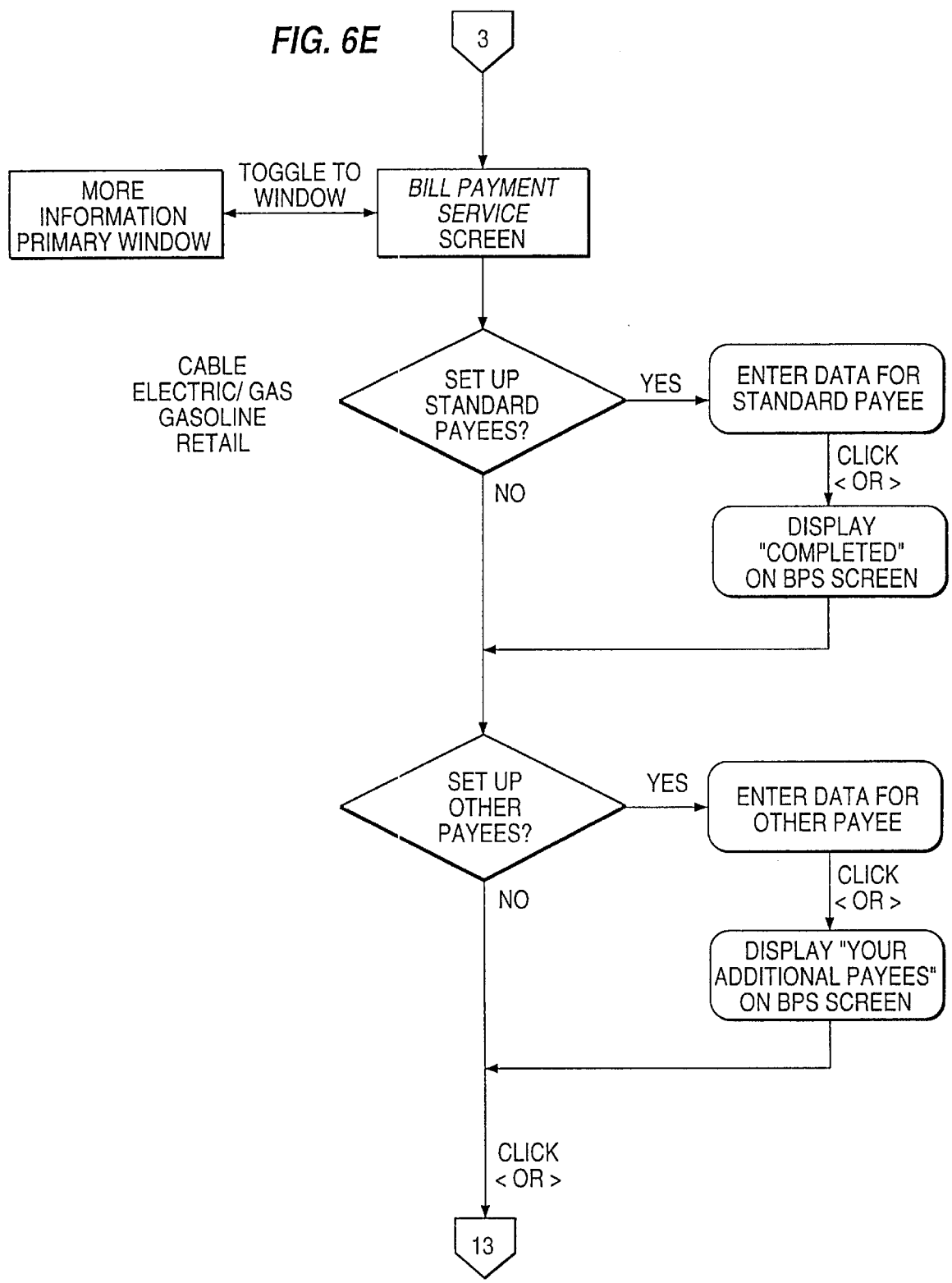
Figure 6F:
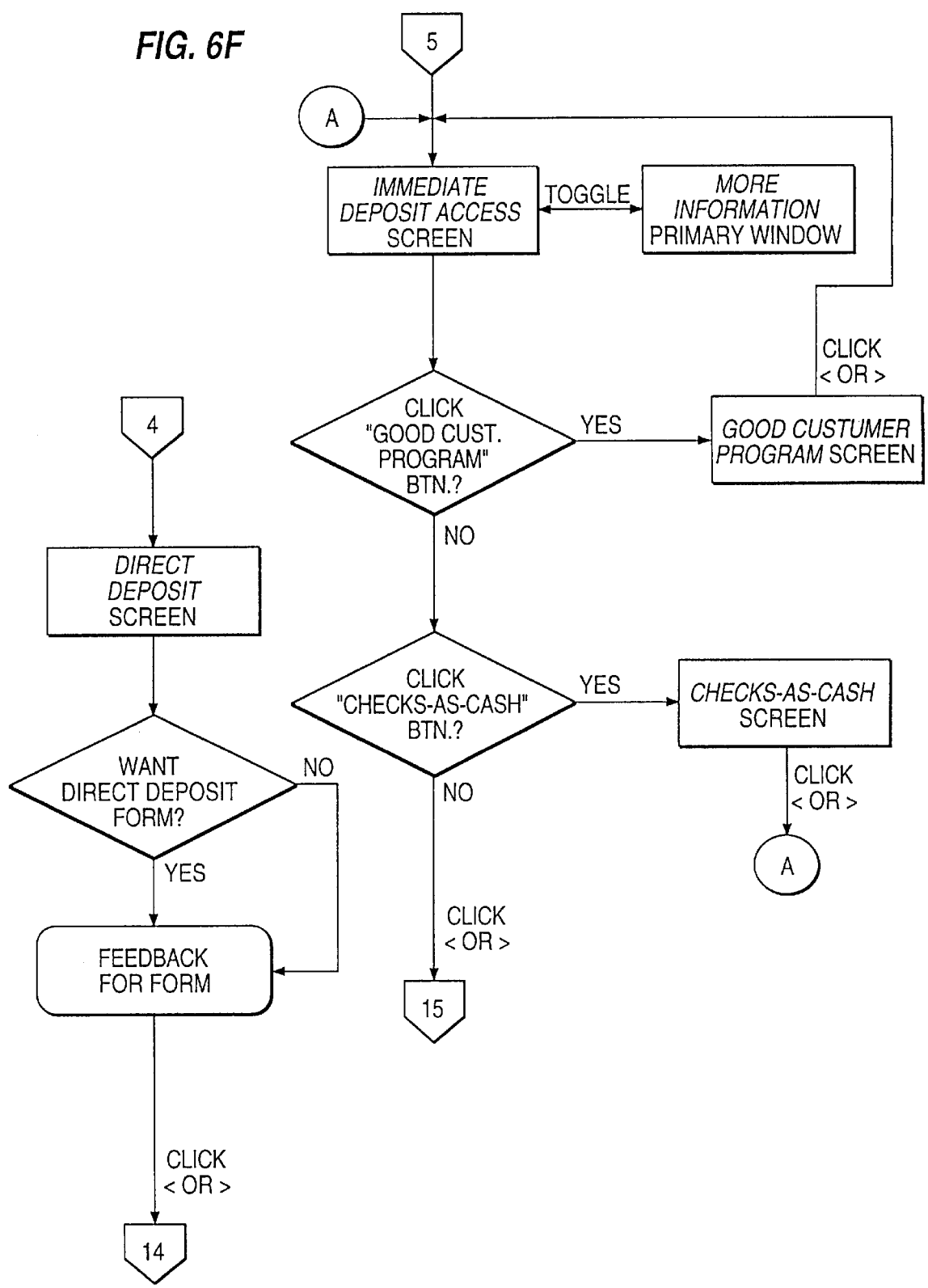
Figure 6G:
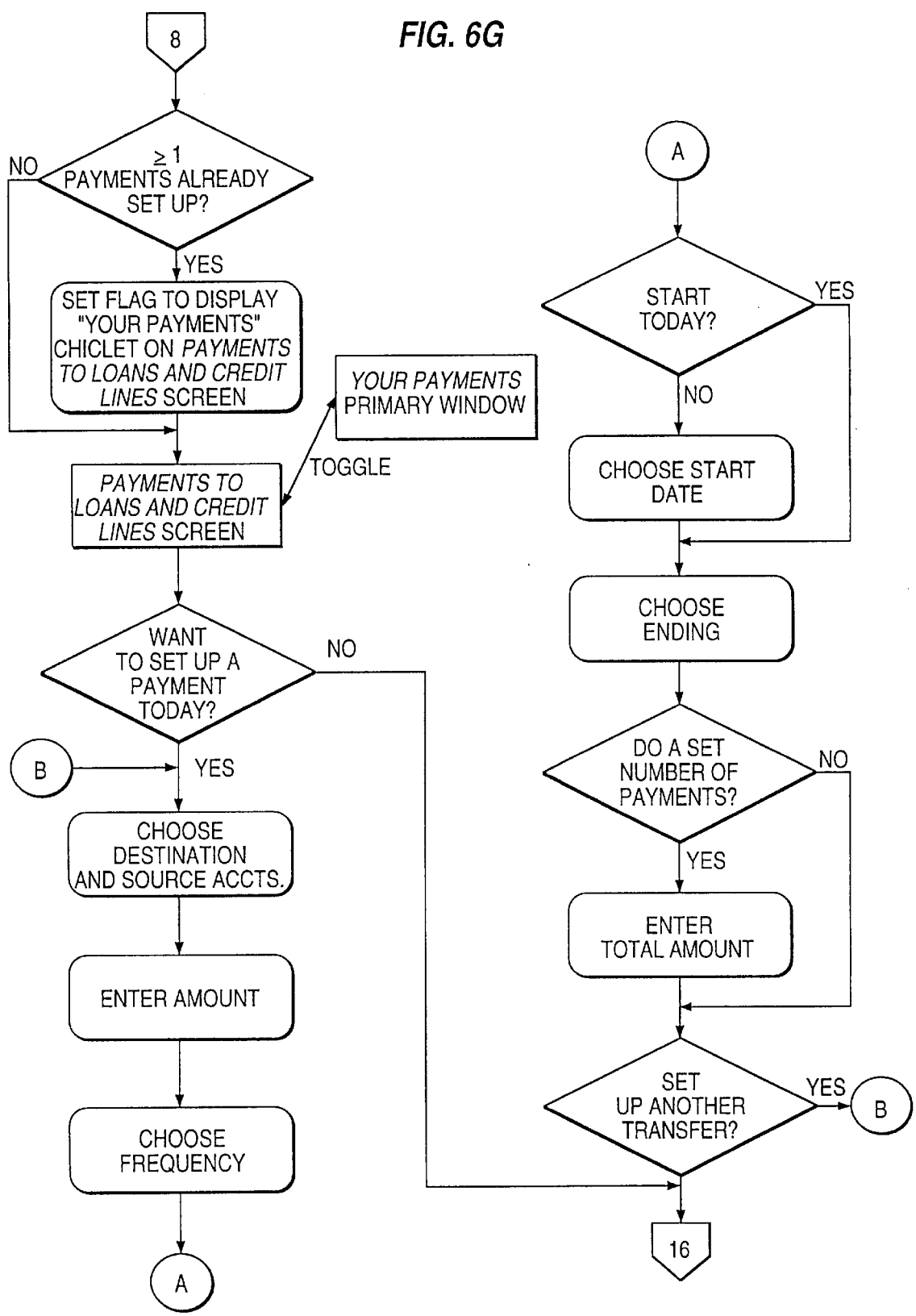

If the user elects to set up or get information concerning bill payment service the system follows the flow shown in FIG. 6E. As shown, the user is allowed to set up standard payees and special payees. If the user elects to set up direct deposit or immediate access to deposited funds the system follows the appropriate flow shown in FIG. 6F. If the user elects to set up automatic payments, the system follows the flow shown in FIG. 6G. As shown therein, the system allows the user to set up multiple payments to loans and credit lines and to select the frequency of such payments.

In every case, after the particular procedure related to any selected service is completed, the system returns to the flow shown in FIG. 6A and 6B. The system then proceeds to the step of access whereby the customer is enabled with regard to the various access points available.

The bankcard personal identification code (PIC) will be selected here. Phone Banking will be discussed and the TPIC (telephone personal identification code) selected. Checks, if applicable, will be ordered.

The system permits the user (personal banker or phone rep.) to enroll the customer in remote access services. A programmed general purpose computer may again be used for this purpose.

The system may provide automatic enrollment in home banking and capture of the customers PC type and diskette size (if needed). Components opened and linked to a bankcard will also be automatically linked for home banking. The system should also permit screen phone use.

Figure 8A:
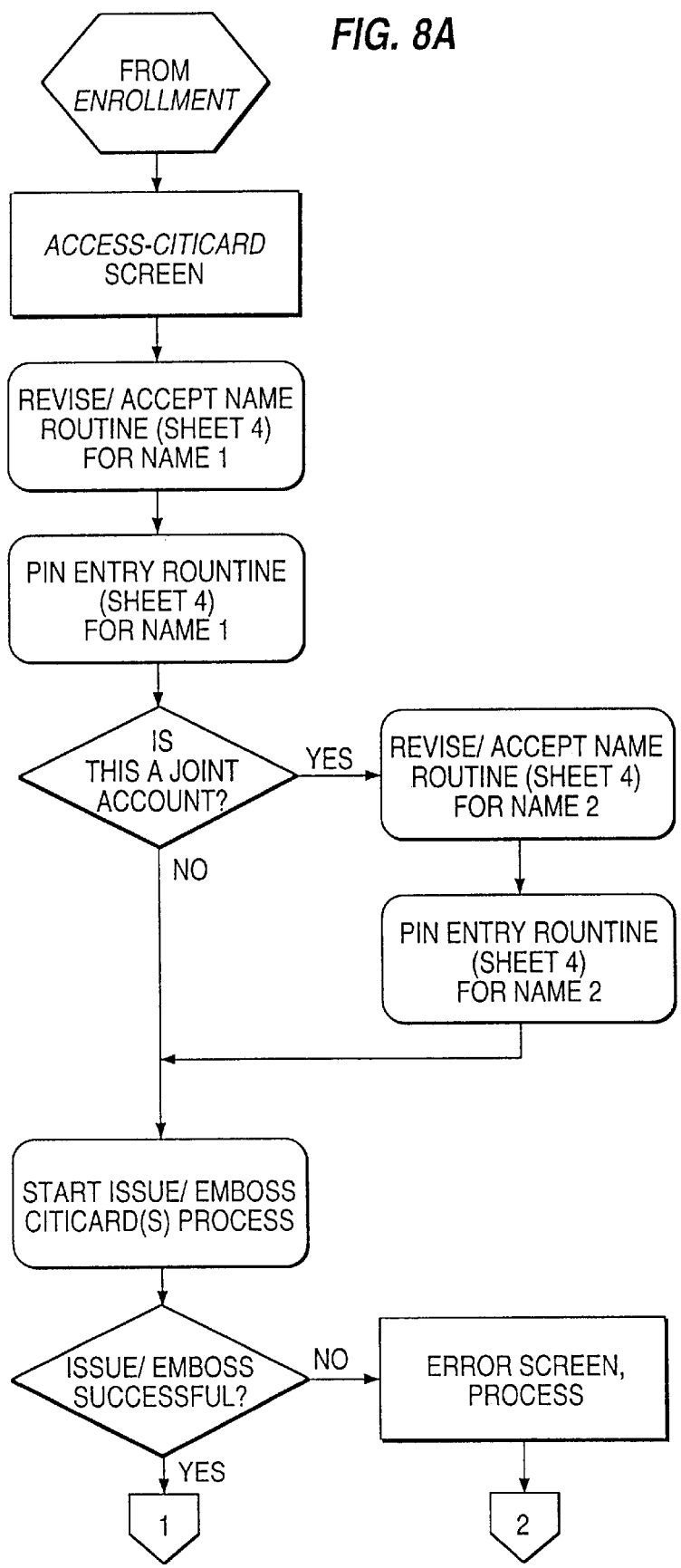
Figure 8B:
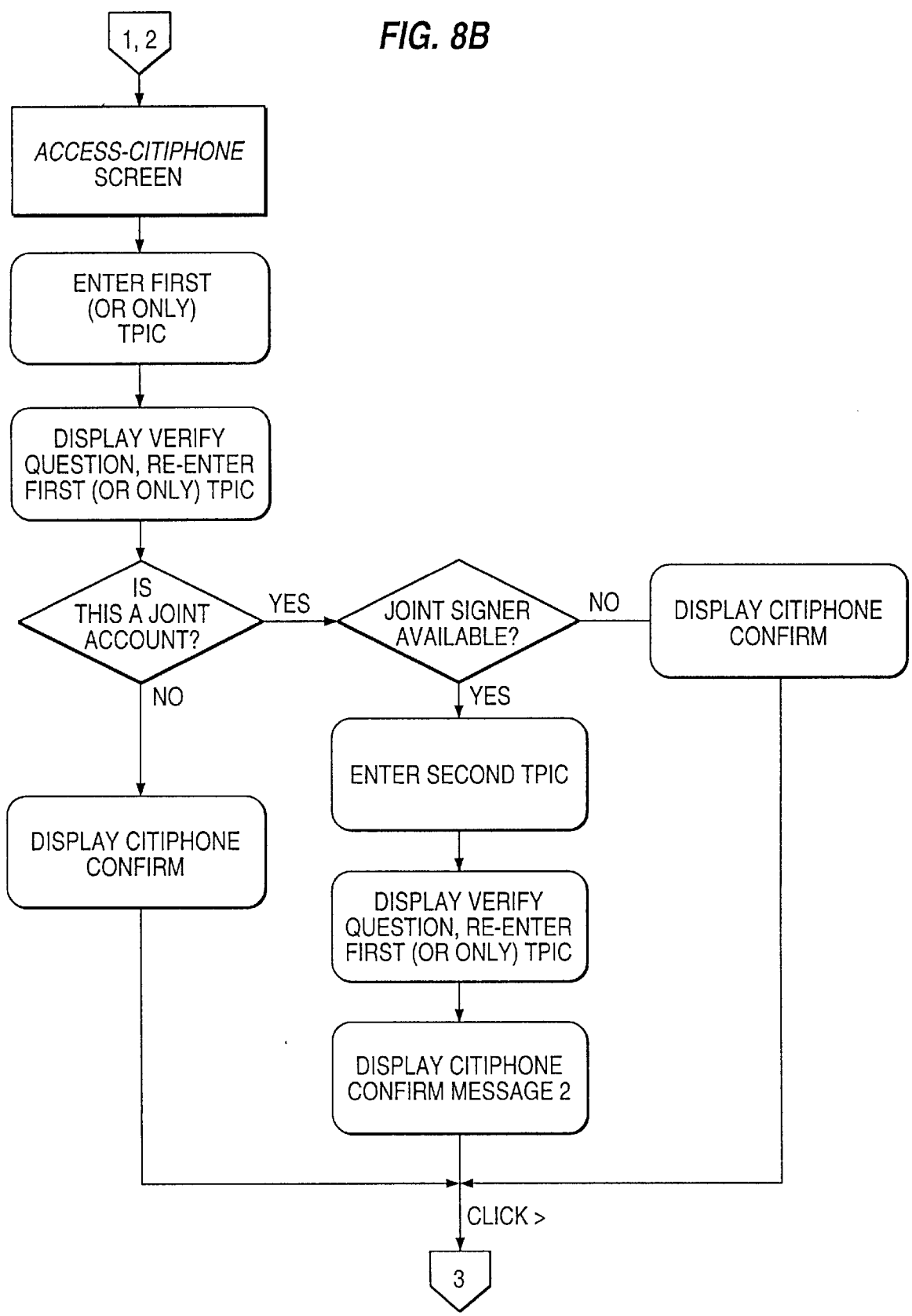
Figure 8D:
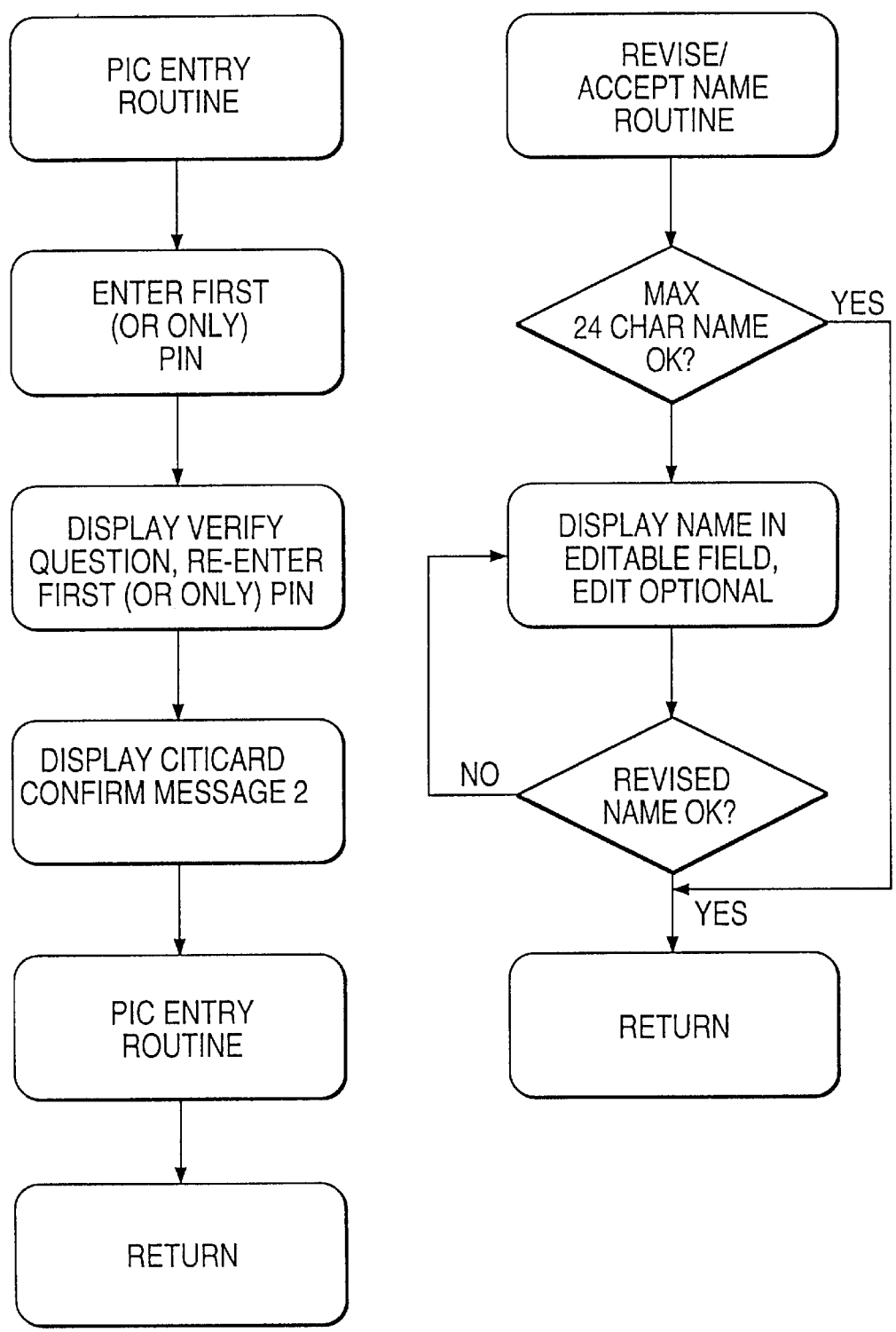

A preferred embodiment of the system for performing the ACCESS step of the present invention is illustrated in FIGS. 8A–8F. As shown in FIG. 8A, the process begins with a display of the access screen. The user is then given the opportunity to revise or accept the account name of record. A sub-routine for this process is shown in FIG. 8D.

The system then enters a personal identification number (PIN) entry routine as shown in FIG. 8D. If the account is a joint account, the name acceptance routine and personal identification entry routine are performed for the second name in the account. The system can then emboss and issue bankcards for the customers. This step may also be deferred. To facilitate embossing, the system preferably includes a conventional embossing machine linked to a general purpose computer. If the embossing is not successful, the system will perform an error screen process, but allow the overall flow to continue.

Figure 8E:
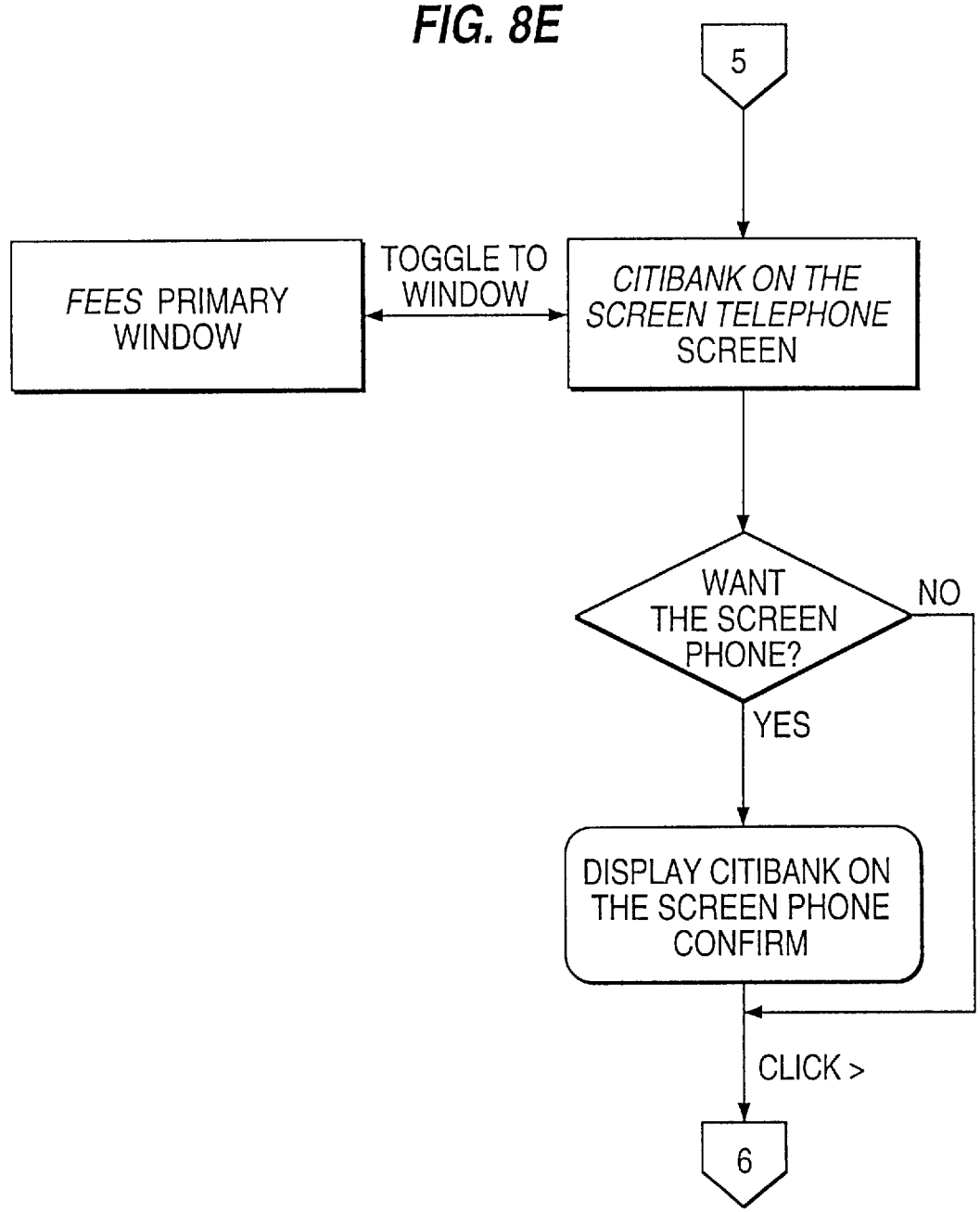
Figure 8F:
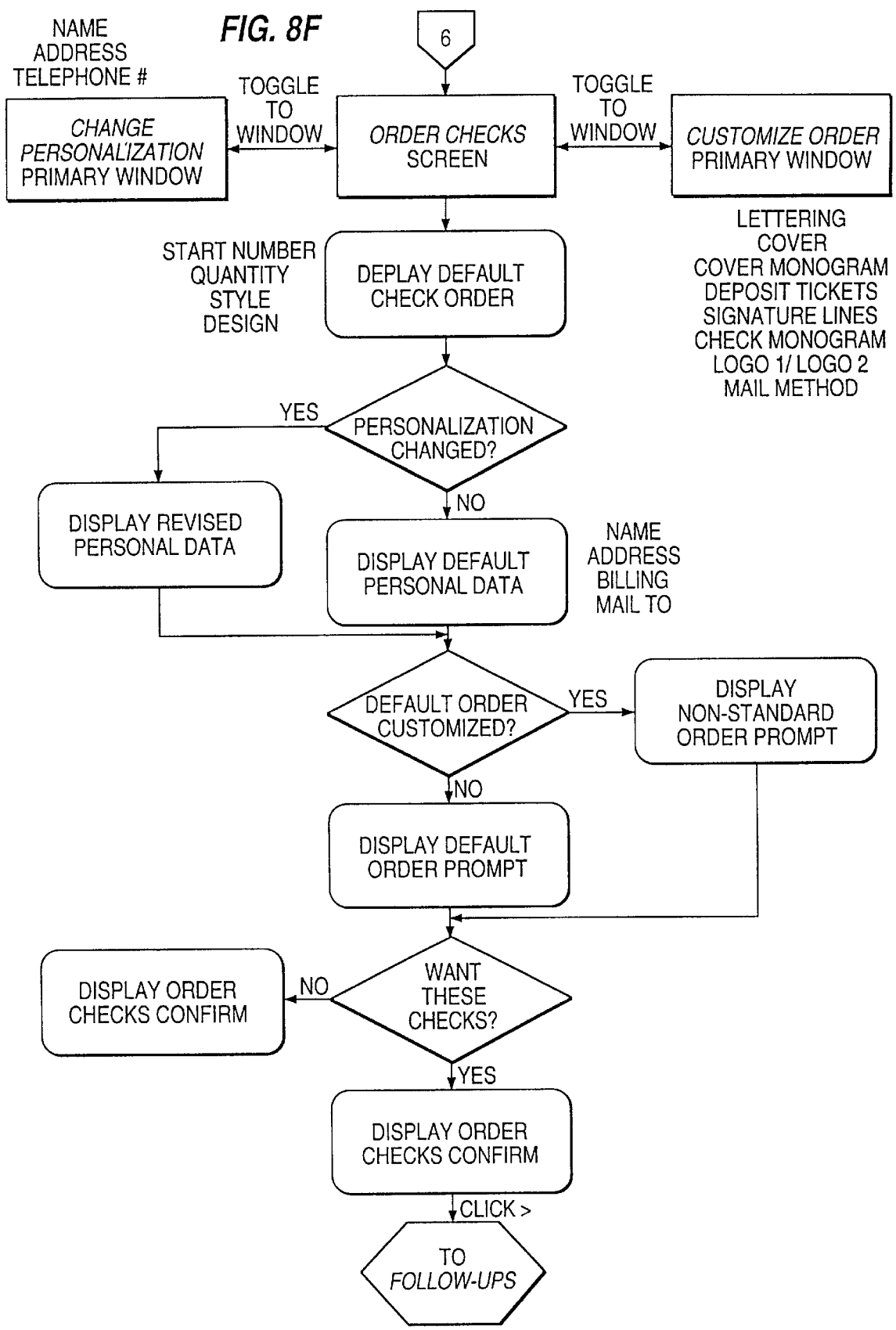

The flow continues as shown in FIG. 8B. Specifically, the system allows selection of a telephone personal identification code that is verified. The process proceeds for any joint signers and then the process continues as shown in FIG. 8C. Here the customer is given the option of remotely accessing the bank by PC. If the user accepts the service, determination is made whether the customer knows all the parameters of his or her computer. If so, the relevant parameters such as type of computer, diskette size, type of modem and modem speed are entered into the system. If the customer does not know one or more of these parameters, a display is made as to the follow ups that will be required and the information is stored for use in the follow up step. The system then proceeds as shown in FIG. 8E. At this point the customer is given the opportunity to access the bank using a screen telephone and the system makes note of the customer's choice then proceeds as shown in FIG. 8F. Here the customer is allowed to order checks. The system begins by displaying a default check order and giving the user the opportunity to change the personalization. This pertains to information such as name, address, billing information and mail address. The user is then given an opportunity to customize the default order and subsequently the user has the opportunity to order checks. The process then proceeds to the special instructions step or the wrap up process shown in FIGS. 9A and B.

SPECIAL INSTRUCTIONS SYSTEM AND STEP (1000)

This step of the process is used to collect any remaining data and deal with any special account situation that had not yet been dealt with in the account opening flow. This would include items such as: best time to call," or "do not contact" flag, "do not share data with other affiliates," "mailing address," "preferred mailing salutation" etc. The system can also attend to closing accounts at other institutions. The system may include a printer and computer which would generate the printing of a collection letter to be sent to the other institution. The system also accommodates naming a Power of Attorney by transmitting the "Power of Attorney" status to the account, eliminating the need for next day file maintenance. The user may also set up an appointment with an Investment Consultant if the user is not licensed or set up an appointment with a Mortgage Consultant. The customer's request for any changes can be accommodated.

Figure 9A:
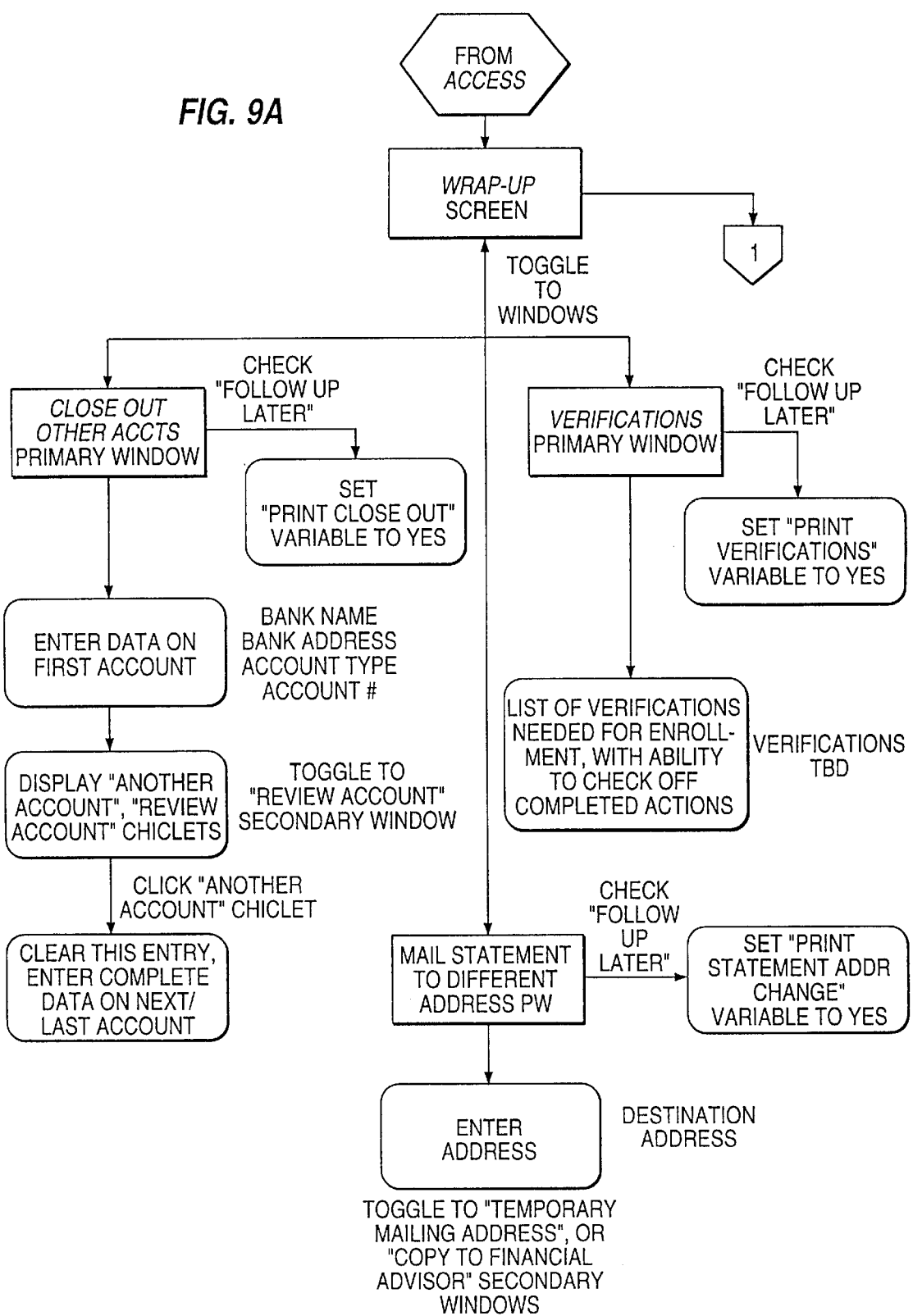
FIGS. 9A–9B are flow charts showing the process of performing the step of follow-ups in the method of FIG. 2.
Figure 9B:
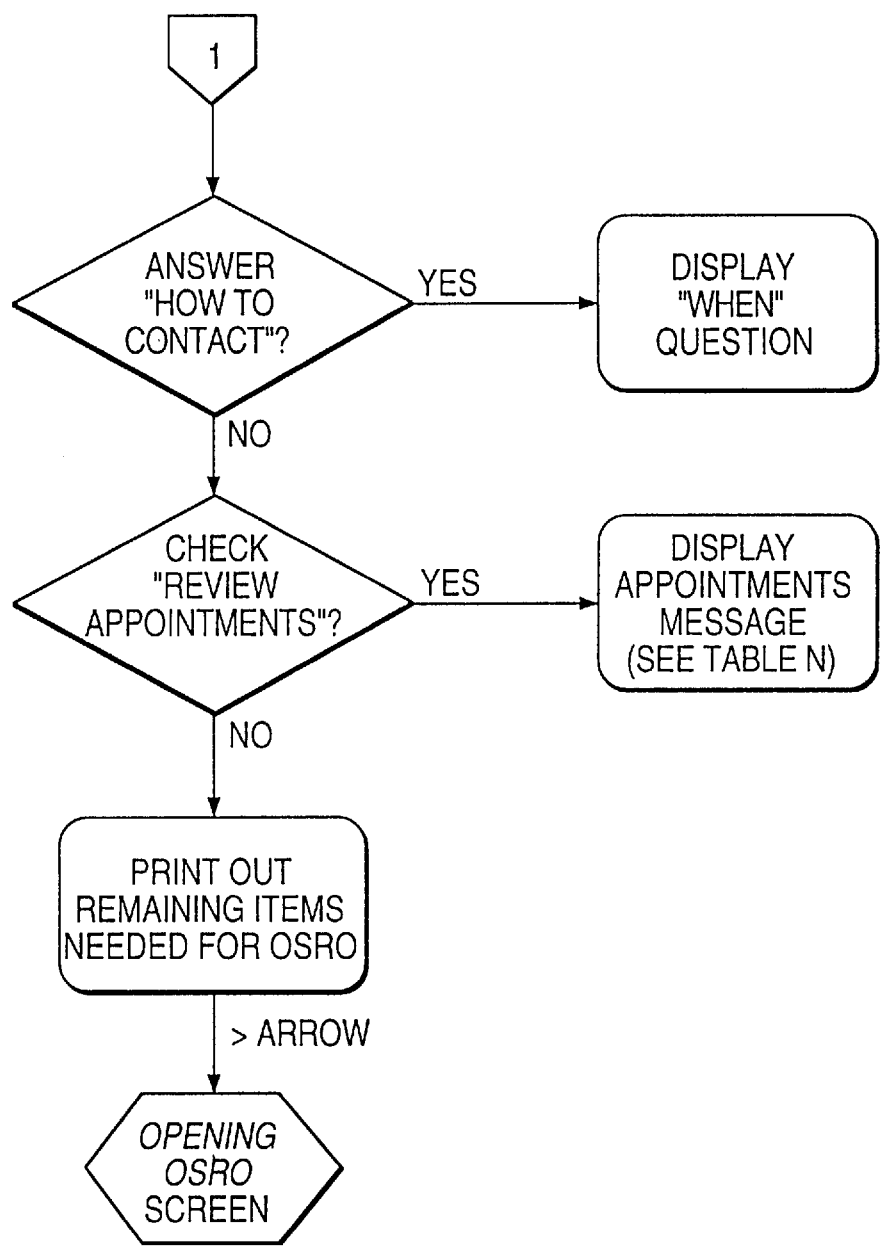

A preferred embodiment of the follow up process is shown in FIGS. 9A–9B. The system begins by displaying information needed to close out and verify various accounts. Again, the system allows both upward and downward flow of data such that only information that has not been previously provided is called for at this step. The system also provides the opportunity to display information concerning how the customer can be contacted and allows the opportunity to display appointments. Finally, the system prints out the remaining items needed to complete the opening of a single fully integrated account.

PRINT/TRANSMIT SYSTEM AND STEP (1100)

After all information has been obtained or the set up is completed, the system proceeds to the step of printing an enrollment package.

The Print function would generate any necessary paperwork that the customer would need to sign as well as any paper that would need to be forwarded to any other units/individuals not able to communicate with Relationship Banking System electronically. This would include, for example, Mortgages and Landmark referrals, Tax Shelter applications, elite account applications, Brokerage application, Securities Investment Acknowledgements, Collection Letters, signature card, Adverse Action Notice, Ready Credit Disclosures, Insurance forms, and passbooks. To accommodate this step, the system includes a printer linked to a programmed general purpose computer.

The customer will be asked to review all the critical demographic information about themselves such as name, address, employment, telephone numbers, etc. This enrollment statement will display accounts opened in the session with opening day balances. For the consumer bank account, the account numbers, opening deposits, rates, and terms will display in the pertinent section of the statement.

The primary difference between the branch and the consumer bank telephone service center is the customer is not physically present to sign any documents or take away hand outs. This means the consumer bank telephone service center fulfillment area will need to mail documents to the customer.

Figure 7:
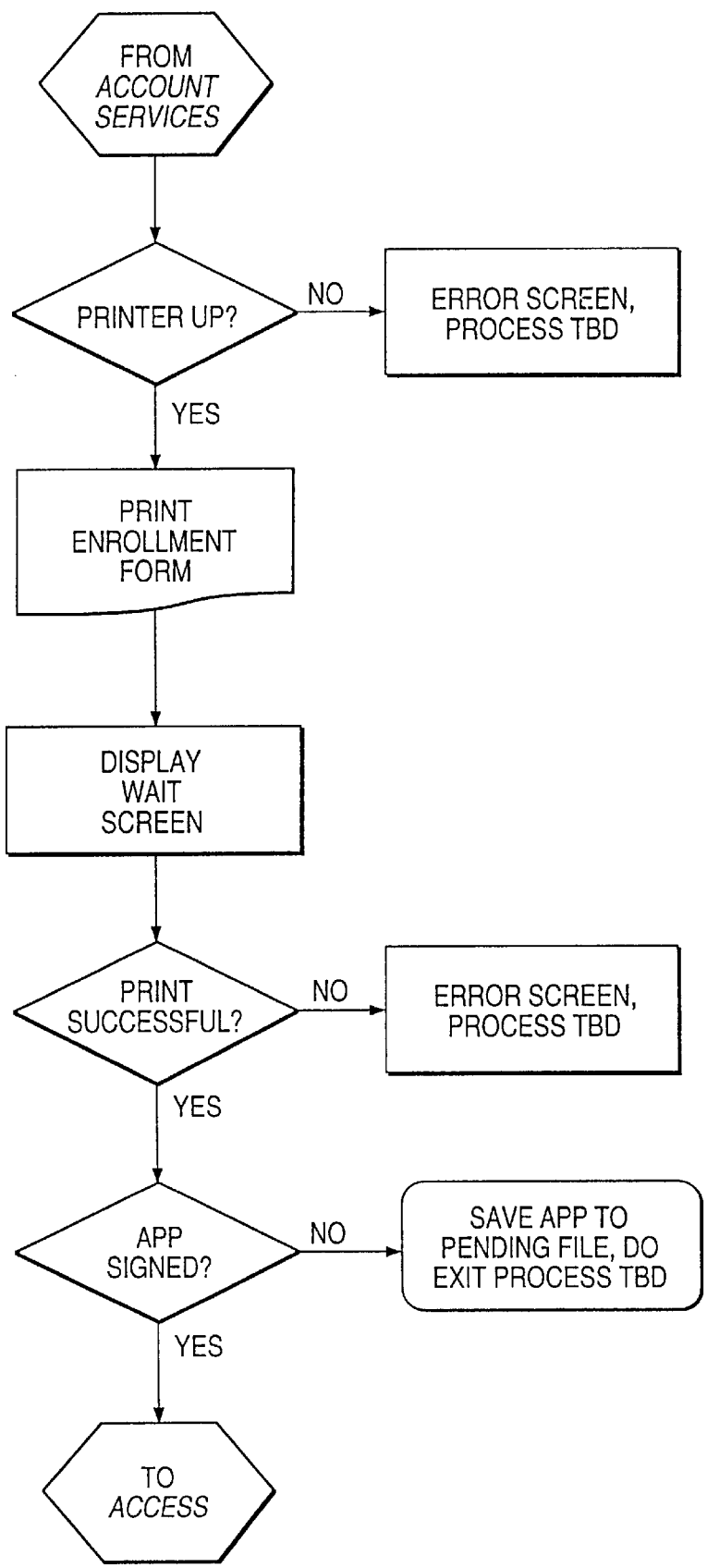
FIG. 7 is a flow chart showing the process of performing the step of printing an enrollment form in the method of FIG. 2.

A preferred embodiment of the process for printing an enrollment form is illustrated in FIG. 7. As shown therein, the system initially confirms that the printer is up. If the printer is not up, the system cannot proceed until the printer is turned on. The, the system commands the printer to print an enrollment form and confirms that the print has been successful. Again, if the print is not successful the process cannot move forward and would ordinarily be repeated if the reason for an unsuccessful print has been identified. After confirming that the enrollment form has been successfully printed the customer is asked to sign the enrollment form. If the customer does not sign the enrollment form at that time, such as when the transaction is performed by telephone, the application is saved to the pending file.

SESSION WRAP (FOLLOW UP) SYSTEM AND STEP (1200)

Finally, the system enters session wrap-up. All appropriate documentation will be signed by the customer. The account opening information will have to be able to be routed to Tax Shelter or a Mortgage Consultant if the situation warrants. The requirement is to perform the referral systematically rather than via a paper copy.

If a follow-up session will be established for the Customer, the user will have the option to print an appointment reminder to give the customer. This handout will include the date and time of the appointment (if available), purpose of the appointment (as input by the user via a free form data entry field) and the name of the Consumer banker the customer will meet with. If a specific appointment date/time cannot be set, an indication that the named Consumer banker will contact the customer. This handout should include the name and mailing address of the customer so it can be placed in a windowed envelope for mailing to a customer if the account opening was handled over the phone.

After the customer leaves, the user or can enter free form notes from the Basic Needs Assessment; retrieve and review the Detailed Needs Assessment answers and update the answers as needed; transmit the Basic and Detailed Needs Assessment information.

PENDING FILE

During the Account Opening flow, the ability to place the session into pending will be available. The main places in the flow where the pending process will most often be invoked is prior to transmission to the Credit Bureau (if SSN is not available) or after the Quality Control check and information needed is flagged as missing. The customer may also need to leave due to a time restraint that could result in a need to pend at any point. A customer may also only get through Needs Assessment and want to return to continue the application process at a later date. The system makes it possible to pend one portion of the session, such as Brokerage, and transmit the remaining components, such as consumer banking.

When an existing customer is profiled in the Greeter function, if there are any sessions pending for that customer, that fact be noted on the profile. If the user (greeter) does not profile the customer, he should still be able to pull up any pending application through a pending items function. The Pending items will have multiple ways to be accessed which include by Customer name, by user ID, by Branch, and by product.

The pending application will be presented to the user in the Account Opening screen flow. The user should also be allowed to perform a Quality Control check to have the system identify items missing that are needed prior to transmission to the host.

The customer will have the option to go into a branch of their choice to complete the account opening. The branch staff would also have access to these pending applications. The workstation screen should also flag the Customer Representative that Pending items are outstanding on the customer when they enter the customer on the "Identify Customer" screen.

Thus, by virtue of the integrated account and account opening system of the present invention, the customer will be offered all components of the Bank Account. The process will be flexible enough to support the customer who wants only one component to those interested in the full offering. Once customer data is entered into the system, the customer will never have to repeat the same information to any bank employee. During the account opening session, information will flow seamlessly between bank employees (users) to improve the customer experience. Data on existing customers can be made readily available at all customer contact points subject to legal restrictions on data sharing which may exist. The capability will be provided to issue a bankcard to all customers, even if the only component activated is a Passbook Savings or a Certificate. The bankcard is used as the customer's identification at the Teller Window or over the phone at the telephone service center and will be available for linking new components when they are activated.

As a result, customers will utilize more of the components of the integrated account. This should generate an increase in revenue and improved customer satisfaction, maximize the available selling time for the branch staff and provide the telephone service center with identical functionality to the branch.

What is claimed is:

1. A method of opening a single integrated account for a customer in a single session comprising the steps of:
   building a database containing a customer profile that includes demographic information and customer financial information;
   performing a needs analysis based on information collected;
   receiving a customer selection of at least one component for the single integrated account;
   recommending an account based on the needs analysis and presenting information concerning at least one selected component of the single integrated account to the customer;
   displaying an image of a bank statement;
   updating the database to reflect the customer's selection of at least one single integrated account component;
   displaying a second image of a representation of a bank statement which image is revised to reflect the customer's selection; and
   printing at least one enrollment form.

2. An integrated financial system comprising:
   a single integrated customer account that permits a customer to perform various financial transactions including at least banking transactions and brokerage transactions;
   a user interface for allowing a customer to access the single integrated account from a plurality of different sources including at least one of an automatic teller machine, a phone and a personal teller transaction;
   means for collecting information from the customer;
   means for receiving a customer selection of at least one component of the single integrated account;
   means for performing a needs analysis based on information collected;
   means for recommending an account based on the needs analysis; and
   means for presenting information concerning at least one component of the single integrated account to the customer.

3. The integrated financial system of claim 2, wherein the single integrated account includes a credit card component.

4. The integrated financial system of claim 2, wherein the single integrated account includes a line of credit component.

5. The integrated financial system of claim 2, wherein the single integrated account includes a secured credit component.

6. The integrated financial system of claim 2, wherein the single integrated account includes a money market component.

7. In an integrated financial system of the type comprising a single integrated account that includes at least a checking component, a savings component and a brokerage component, a system for opening the single integrated account in one session comprising:
   means for assembling a personal profile that includes means for collecting salient data,
   means for building the single integrated customer account that includes means for building at least a checking component, a savings component and a brokerage component;
   means for receiving a customer selection of at least one component of the single integrated account;
   means for performing a needs analysis based on information collected;
   means for recommending an account based on the needs analysis;
   means for presenting information concerning the selected component of the single integated account to the customer; and
   means for allowing data collected to flow to all other points where the data is required so that data need not be entered more than once.

8. The system of claim 7, further comprising means for generating multiple prompts for certain pieces of data such that the user may exercise personal judgment concerning the appropriate time to collect such data.

9. The system of claim 7, further comprising pending file means for storing information that is collected, but not immediately needed.

10. The system of claim 7, wherein each component of the single integrated account includes data fields and the system further comprises means for transferring data between the data fields and means for entering data fields in different components that are related such that data entered in one data field can be copied into other related data fields.

11. The system of claim 7, wherein the means for building the single integrated account comprises means for building a credit card account component.

12. The system of claim 7, wherein the means for building the single integrated account comprises means for building a line of credit account component.

13. The system of claim 7, wherein the means for building the single integrated account comprises means for building a secured credit account component.

14. The system of claim 7, wherein the means for building the single integrated account comprises means for building a money market account component.

15. The system of claim 7, wherein the means for building the single integrated account comprises means for building an insurance account component.

16. The system of claim 7, wherein the means for building the single integrated account comprises means for building a retirement account component.

17. The system of claim 7, further comprising means for displaying a representation of a bank statement connected to the means for building the single integrated account, whereby as the account is built the representation of the bank statement is updated.

18. The method according to claim 1, wherein said demographic information and customer financial information includes credit information and financial goals.

19. A method of providing a financial services account, comprising:

opening a single integrated account that permits a customer to establish a plurality of components for performing financial transactions, the single integrated account having a time of opening;

creating a personal profile including substantially all demographic and financial data about the customer at the time of opening;

accessing the profile so that only unknown data is requested from the customer in the establishment of each of the plurality of components for performing financial transactions;

receiving a customer selection of at least one component of the single integrated account;

performing a needs analysis based on the personal profile;

recommending an account based on the needs analysis; and presenting information concerning at least one component of the single integrated account to the customer.

20. A method of providing financial services as recited in claim 19, wherein said plurality of components for performing financial transactions comprises at least one of an investment component, a banking component, a bill payment component and a lending component.

21. A method of opening a single integrated account for a customer in a single session comprising:

building a database containing a customer profile that includes demographic information and customer financial information;

performing a needs analysis based on information collected;

receiving a customer selection of at least one component for the single integrated account;

recommending an account based on the needs analysis;

presenting information concerning at least one selected component of the single integrated account to the customer;

updating the database to reflect the customer's selection of at least one single integrated account component; and displaying an image of a representation of a bank statement, wherein the image reflects the customer's selection of at least one single integrated account component.

22. The system of claim 2 further comprising:

means for updating the database to reflect the customer's selection of at least one single integrated account component; and means for displaying an image of a representation of a bank statement, wherein the reflects the customer's selection of at least one account component.

23. The system of claim 7 further comprising:

means for updating the database to reflect the customer's selection of at least one single integrated account component; and means for displaying an image of a representation of a bank statement, wherein the reflects the customer's selection of at least one account component.

* * * * *